Figure 1:
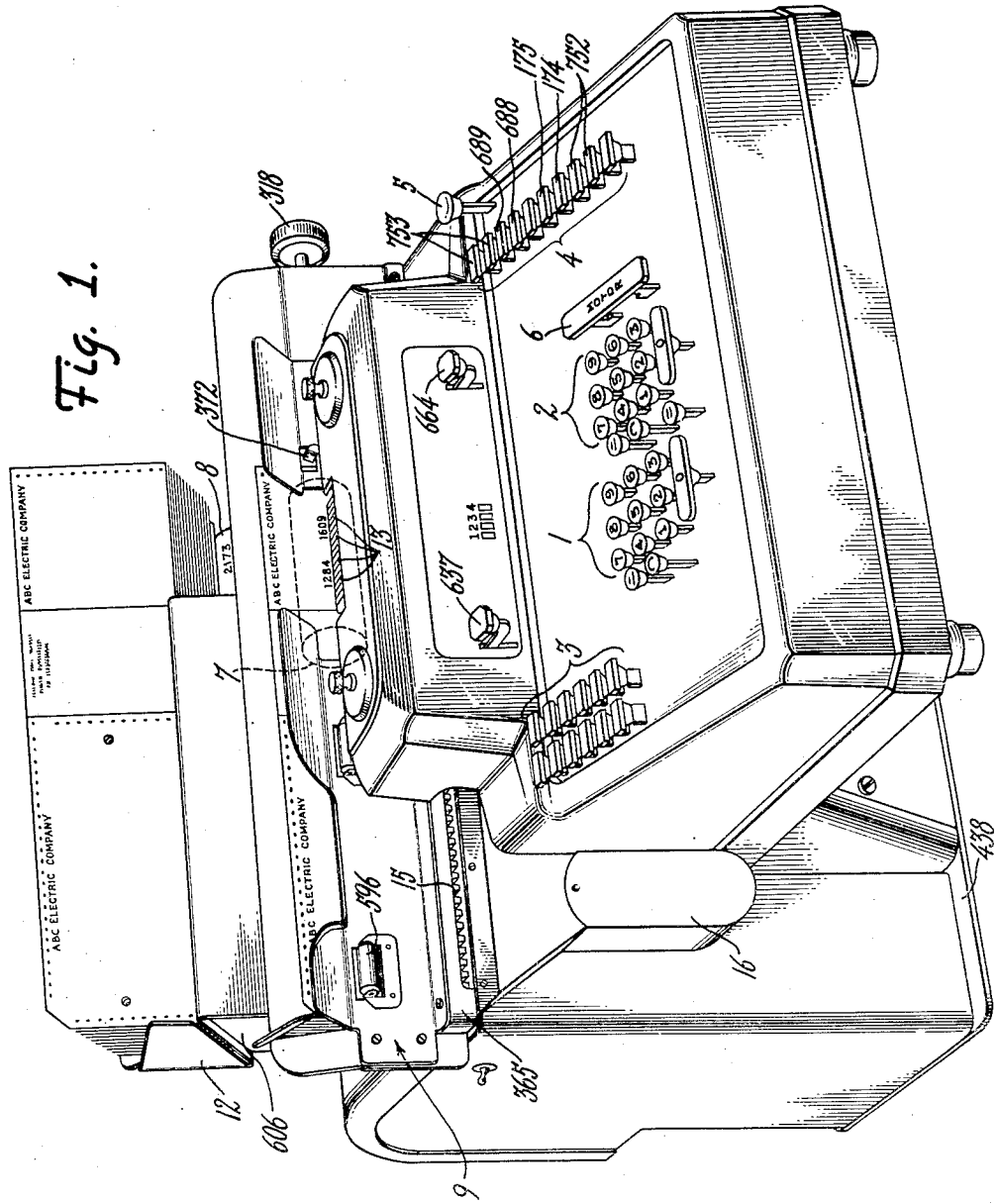

Jan. 18, 1949.   O. J. SUNDSTRAND   2,459,468
ACCOUNTING MACHINE

Filed June 24, 1941   17 Sheets-Sheet 1

INVENTOR
OSCAR J. SUNDSTRAND
BY
ATTORNEY

Jan. 18, 1949.     O. J. SUNDSTRAND     2,459,468
ACCOUNTING MACHINE
Filed June 24, 1941
17 Sheets-Sheet 2

INVENTOR
OSCAR J. SUNDSTRAND
BY
ATTORNEY

Jan. 18, 1949.　　　　O. J. SUNDSTRAND　　　　2,459,468
ACCOUNTING MACHINE
Filed June 24, 1941　　　　　　　　　　　　17 Sheets-Sheet 3
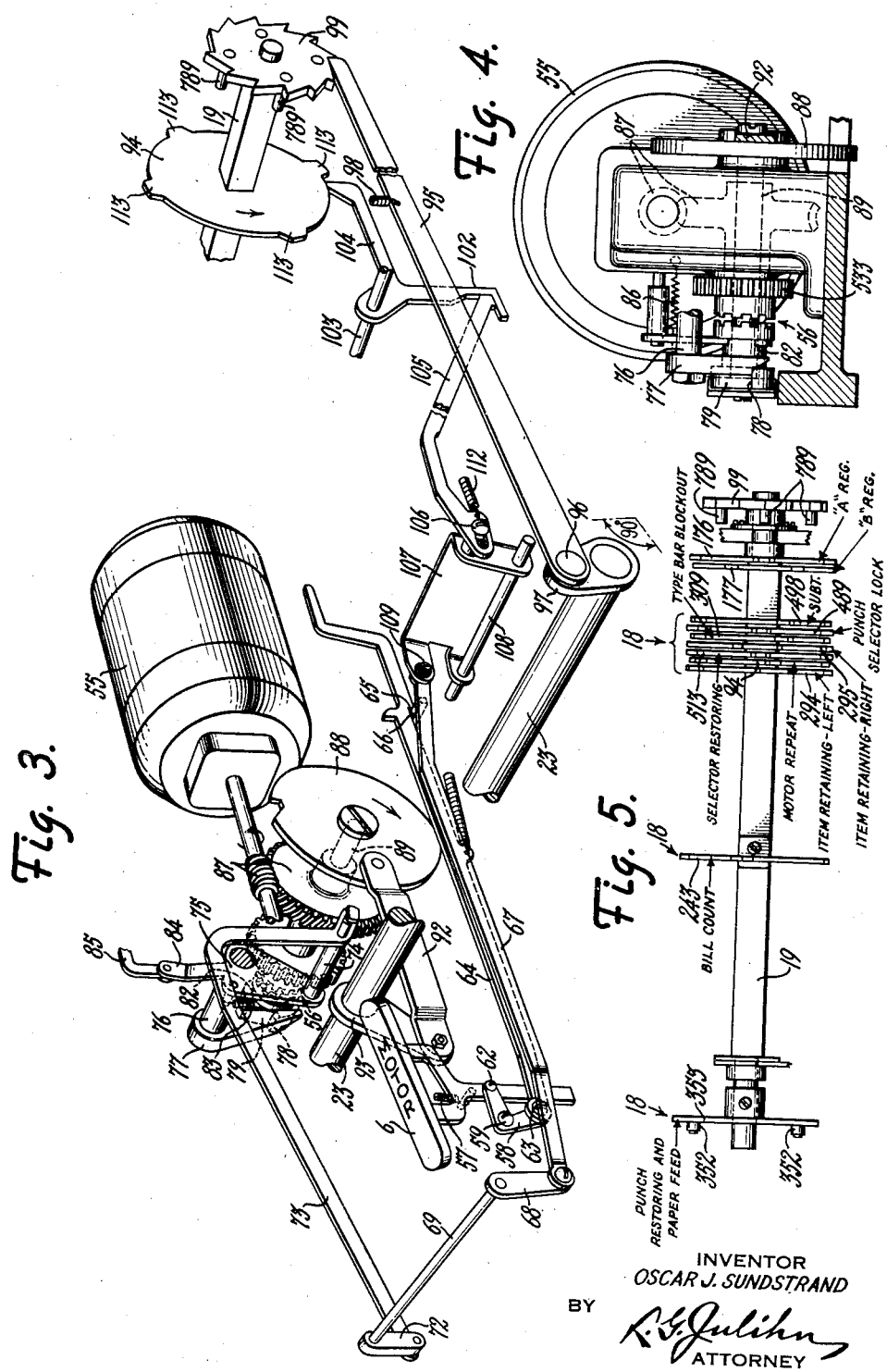
INVENTOR
OSCAR J. SUNDSTRAND
BY
ATTORNEY Jan. 18, 1949.  O. J. SUNDSTRAND  2,459,468
ACCOUNTING MACHINE
Filed June 24, 1941
17 Sheets-Sheet 4
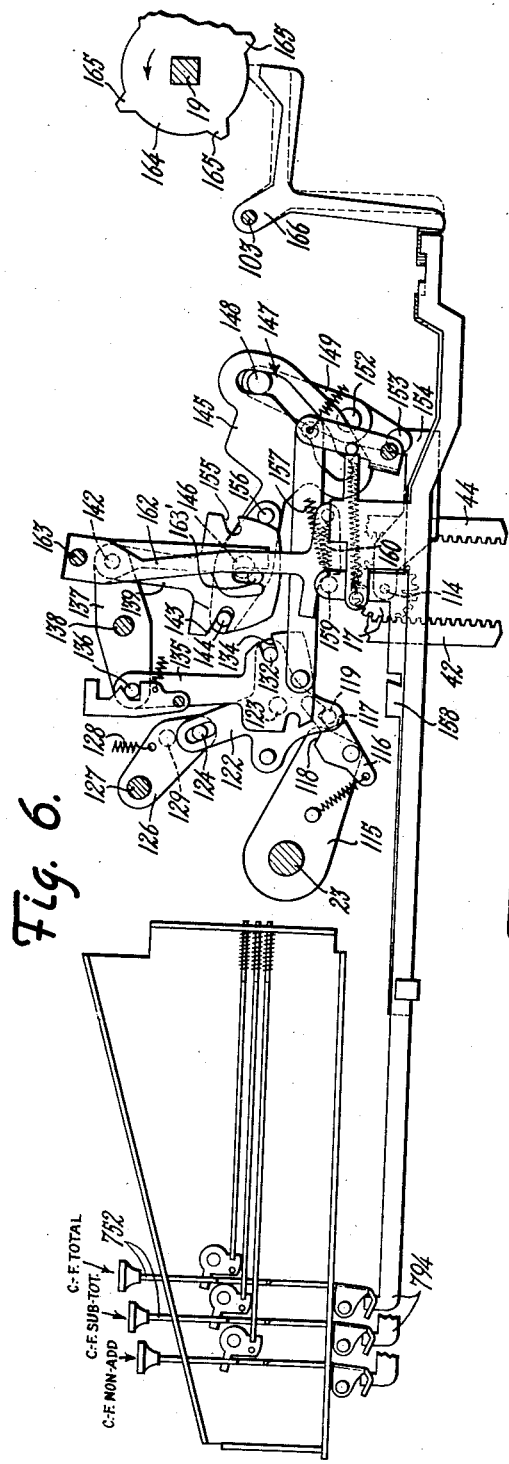
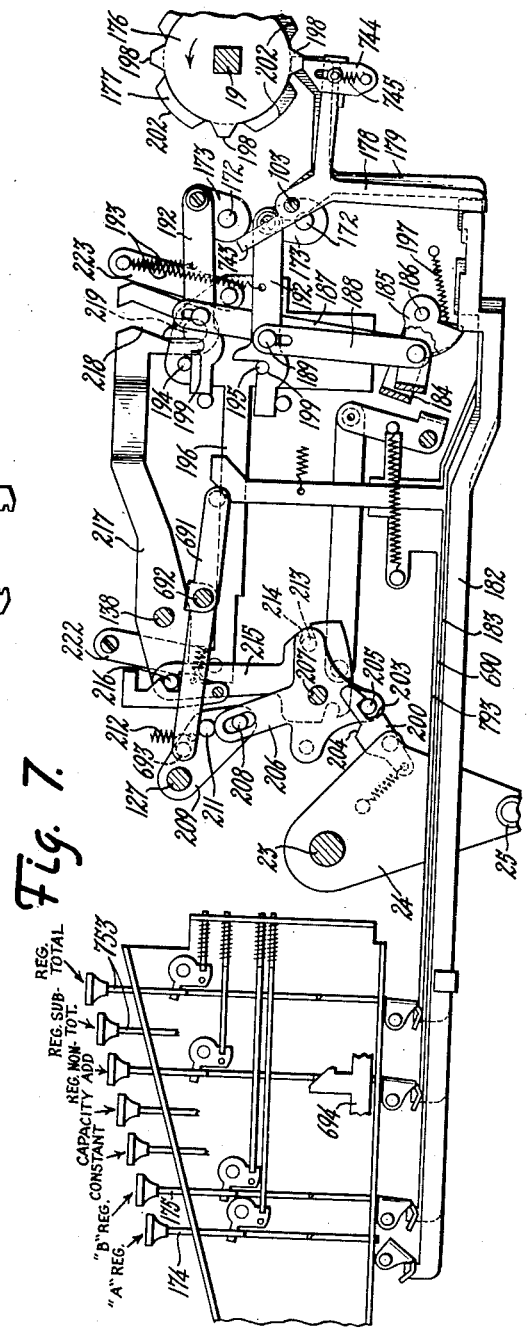
INVENTOR
OSCAR J. SUNDSTRAND
BY
*R. G. Julihn*
ATTORNEY Jan. 18, 1949.  O. J. SUNDSTRAND  2,459,468
ACCOUNTING MACHINE
Filed June 24, 1941
17 Sheets-Sheet 5
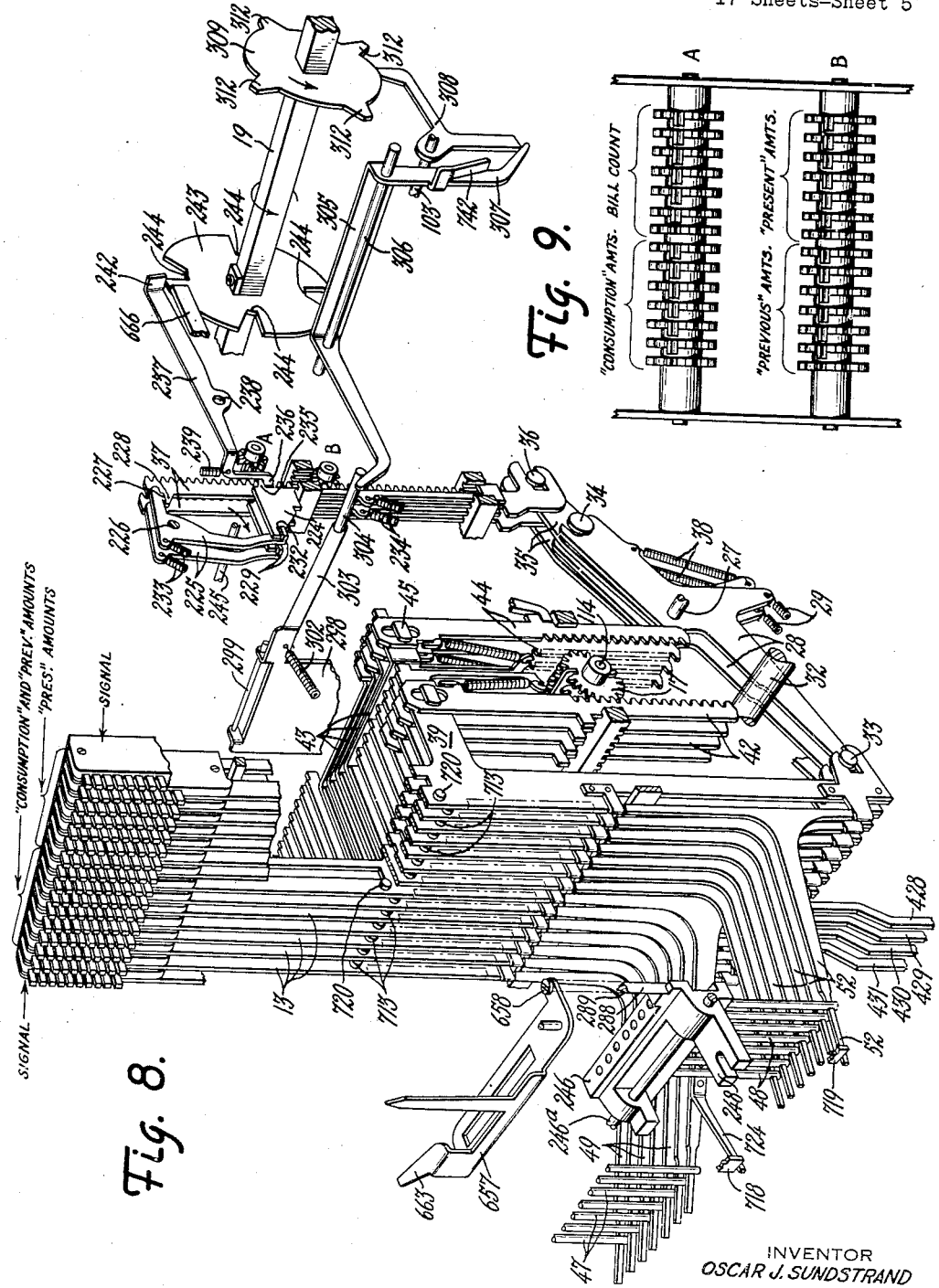
INVENTOR
OSCAR J. SUNDSTRAND
BY
ATTORNEY Jan. 18, 1949.　　　O. J. SUNDSTRAND　　　2,459,468
ACCOUNTING MACHINE
Filed June 24, 1941.　　　17 Sheets-Sheet 6
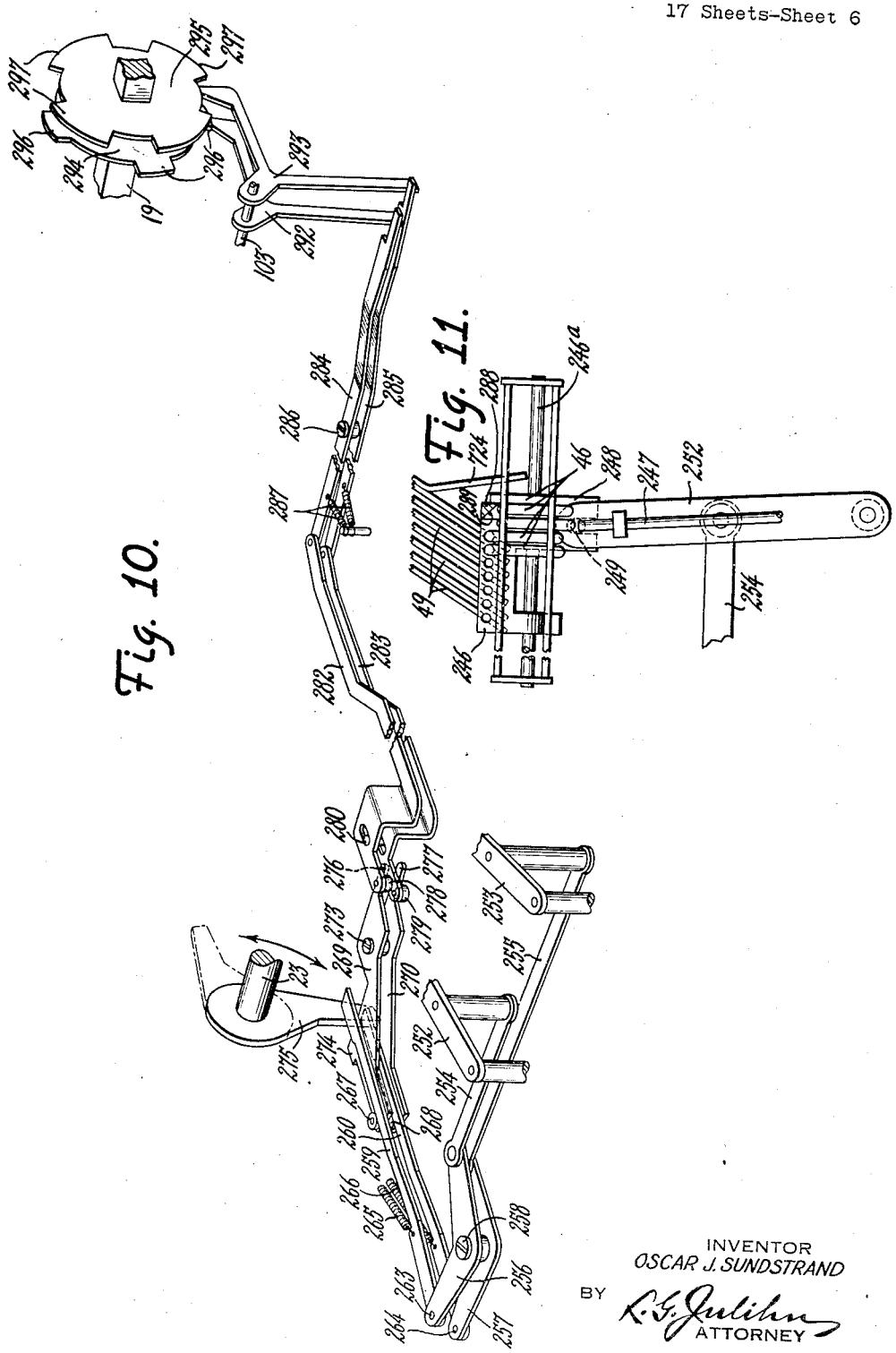
INVENTOR
OSCAR J. SUNDSTRAND
BY
ATTORNEY Jan. 18, 1949.　　　　　O. J. SUNDSTRAND　　　　2,459,468
ACCOUNTING MACHINE
Filed June 24, 1941　　　　　　　　　　　　17 Sheets-Sheet 7
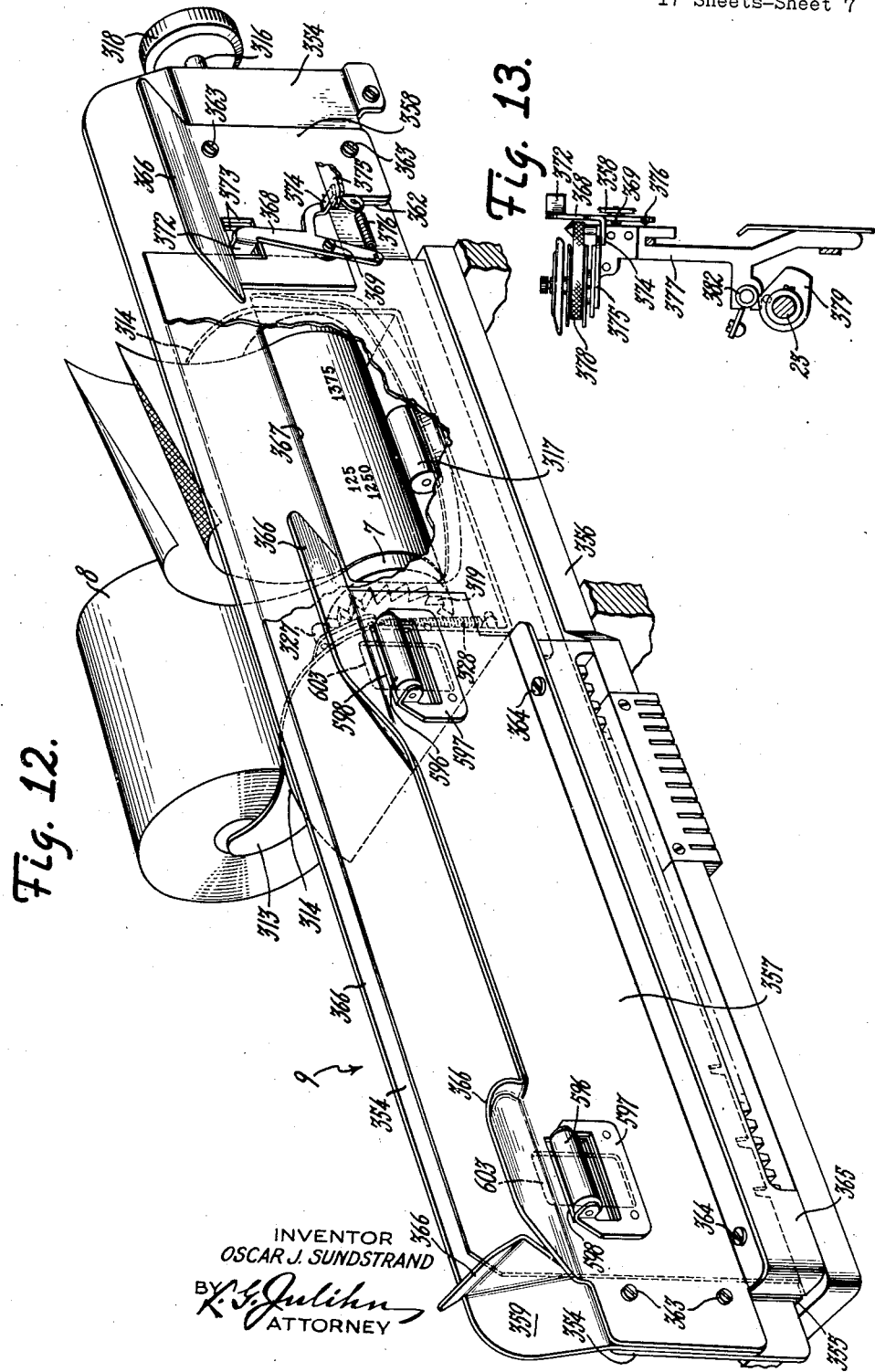
INVENTOR
OSCAR J. SUNDSTRAND
BY
ATTORNEY Jan. 18, 1949.   O. J. SUNDSTRAND   2,459,468
ACCOUNTING MACHINE
Filed June 24, 1941
17 Sheets-Sheet 8
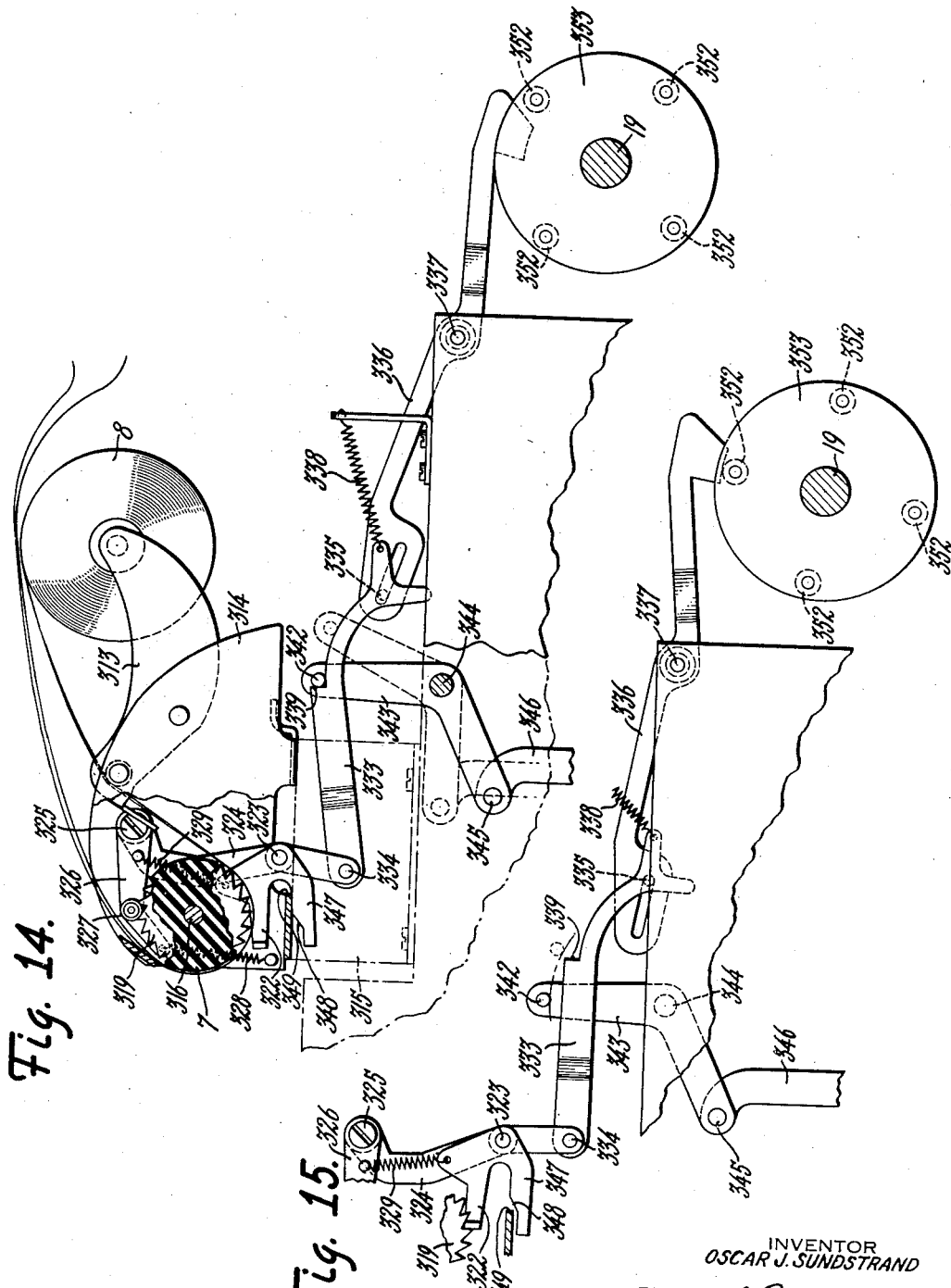
INVENTOR
OSCAR J. SUNDSTRAND
BY
ATTORNEY Jan. 18, 1949.   O. J. SUNDSTRAND   2,459,468
ACCOUNTING MACHINE
Filed June 24, 1941                                    17 Sheets—Sheet 9
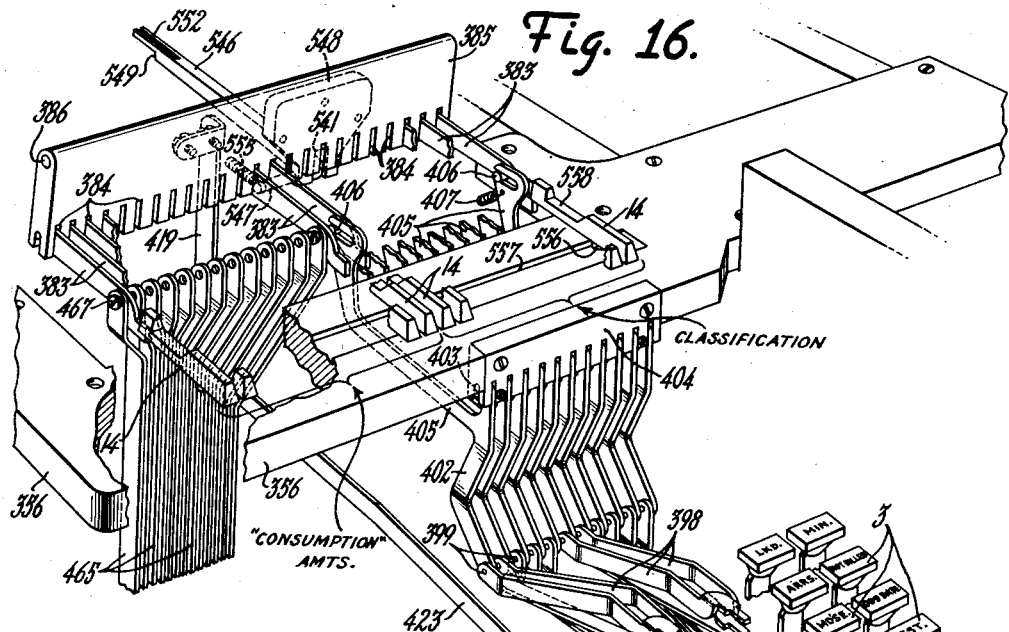
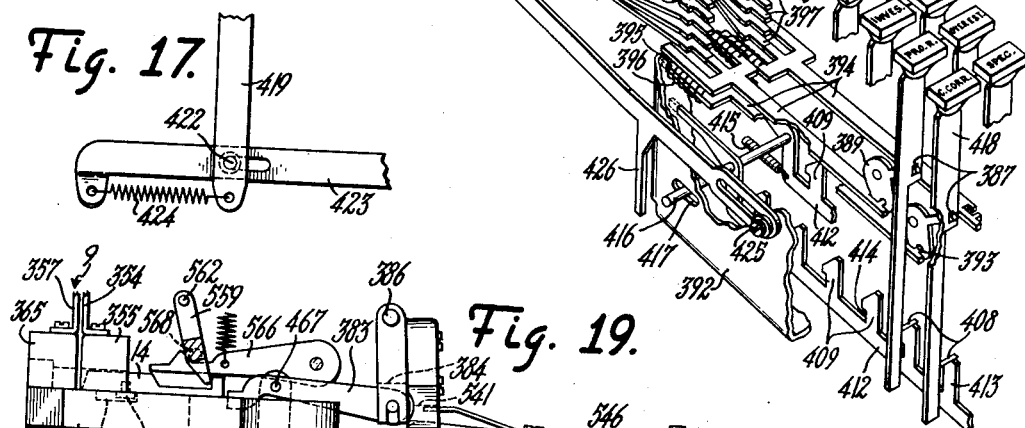
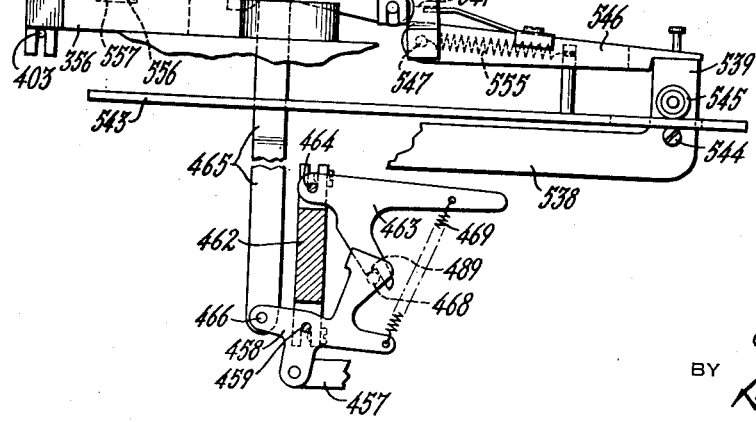
INVENTOR
OSCAR J. SUNDSTRAND
BY
*R. G. Julihn*
ATTORNEY Jan. 18, 1949.  O. J. SUNDSTRAND  2,459,468
ACCOUNTING MACHINE
Filed June 24, 1941

17 Sheets-Sheet 10

INVENTOR
OSCAR J. SUNDSTRAND
BY
ATTORNEY

Jan. 18, 1949.  O. J. SUNDSTRAND  2,459,468
ACCOUNTING MACHINE
Filed June 24, 1941
17 Sheets-Sheet 11
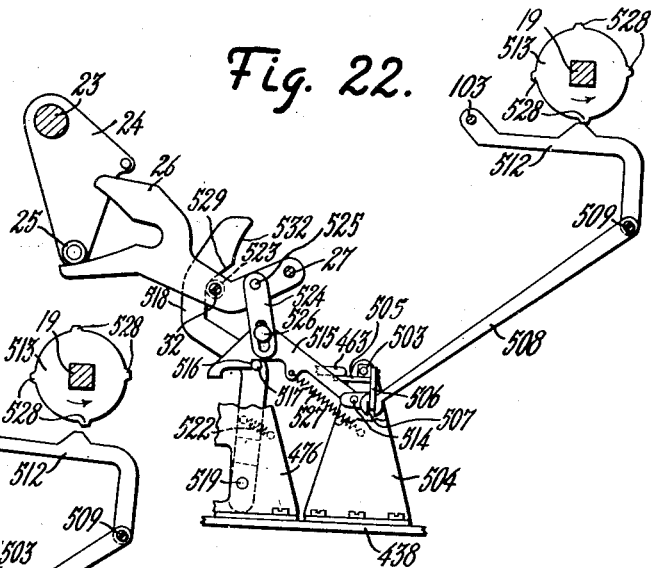
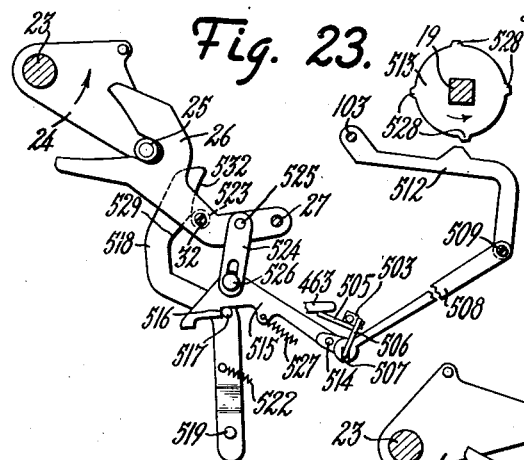
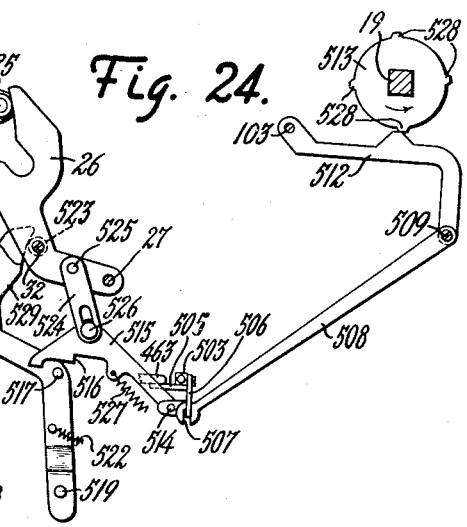
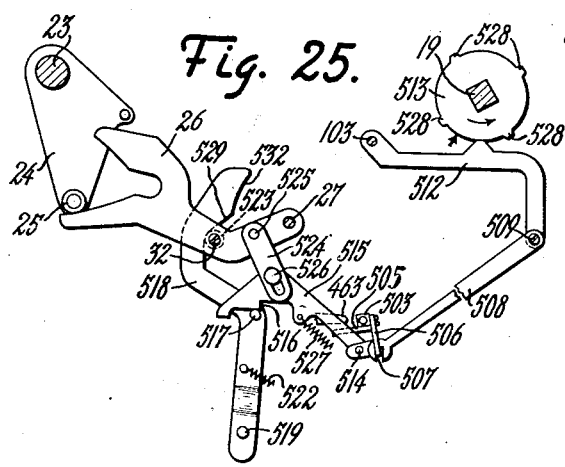
INVENTOR
OSCAR J. SUNDSTRAND
BY
ATTORNEY Jan. 18, 1949.  O. J. SUNDSTRAND  2,459,468
ACCOUNTING MACHINE
Filed June 24, 1941  17 Sheets-Sheet 12

INVENTOR
OSCAR J. SUNDSTRAND
BY
ATTORNEY

Jan. 18, 1949.         O. J. SUNDSTRAND         2,459,468
                        ACCOUNTING MACHINE
Filed June 24, 1941                         17 Sheets-Sheet 13
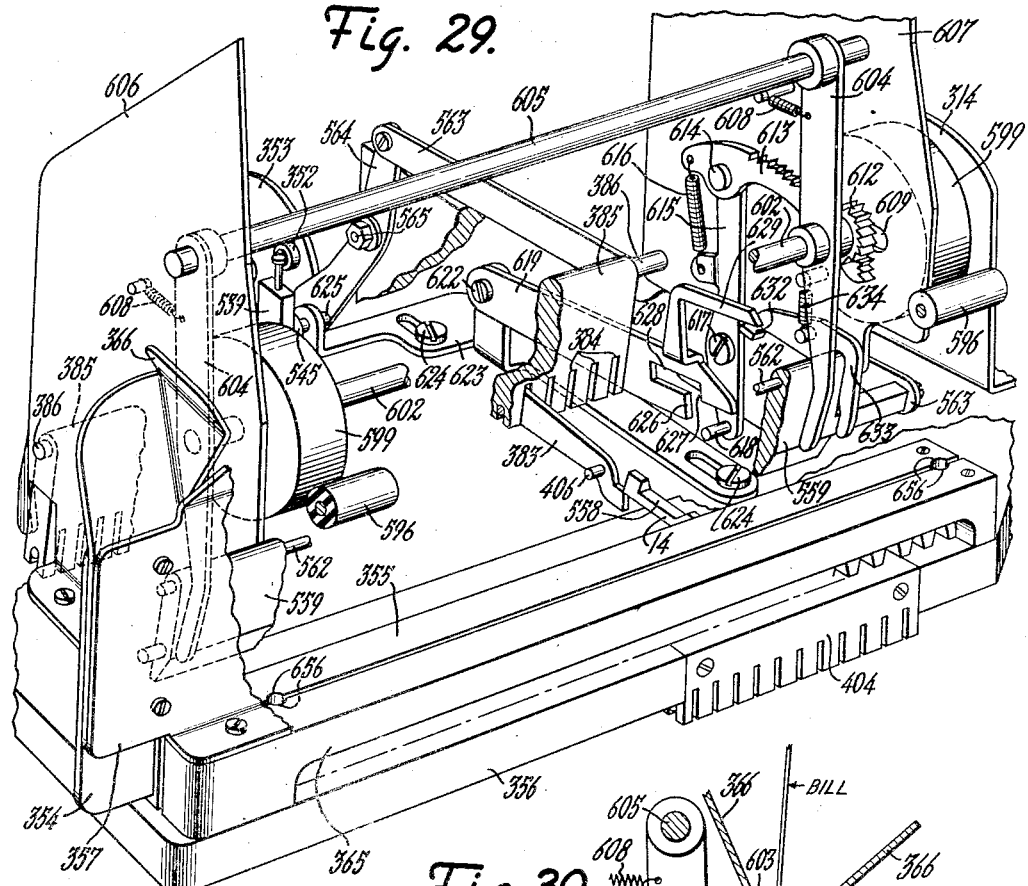

Jan. 18, 1949.                    O. J. SUNDSTRAND                    2,459,468
                                  ACCOUNTING MACHINE
Filed June 24, 1941                                              17 Sheets-Sheet 14
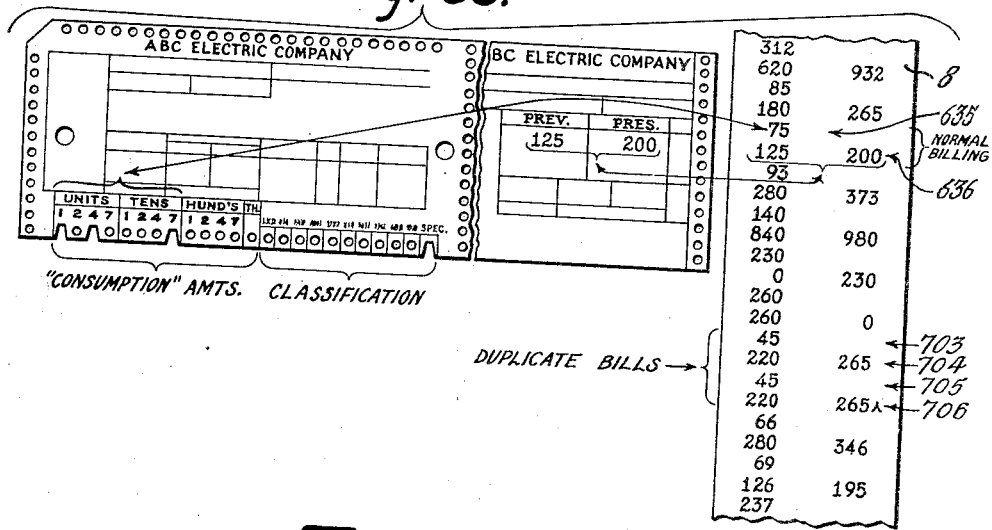
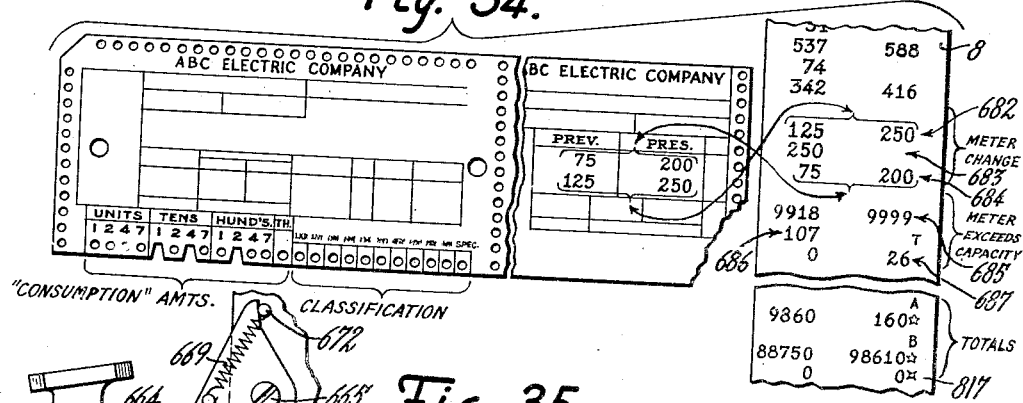
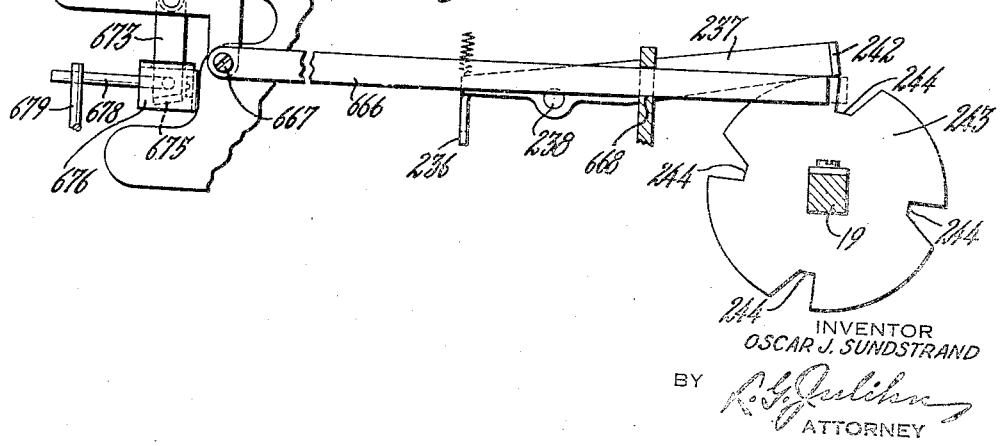
INVENTOR
OSCAR J. SUNDSTRAND
BY
ATTORNEY

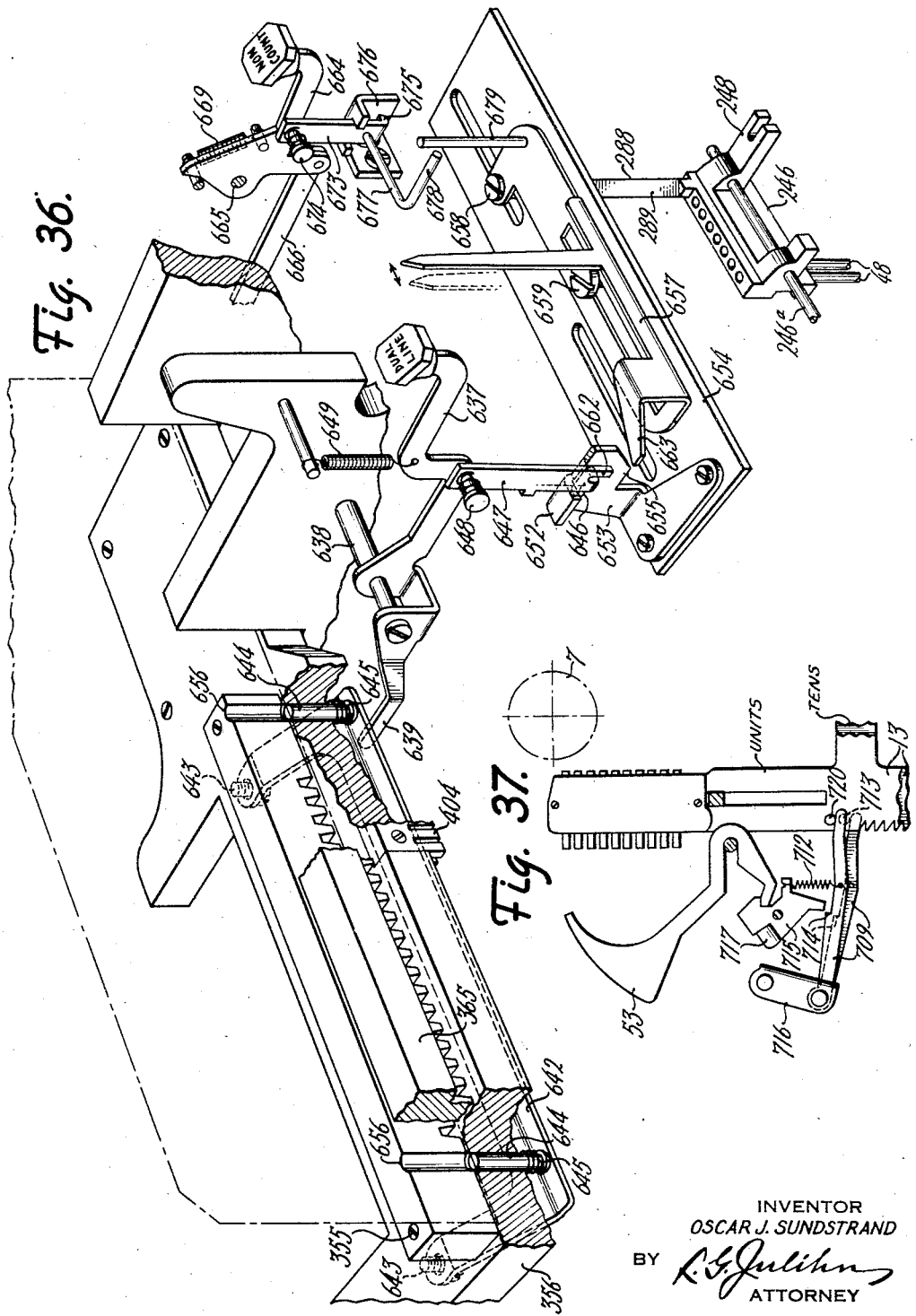

Jan. 18, 1949.　　　O. J. SUNDSTRAND　　　2,459,468
ACCOUNTING MACHINE
Filed June 24, 1941　　　　　　　　17 Sheets-Sheet 16
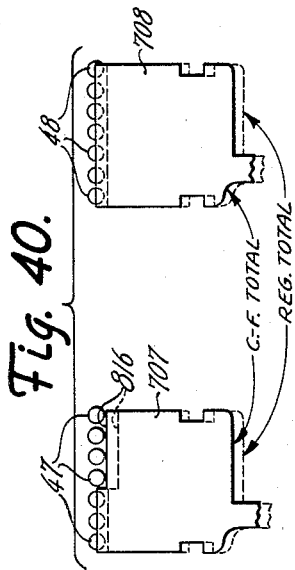
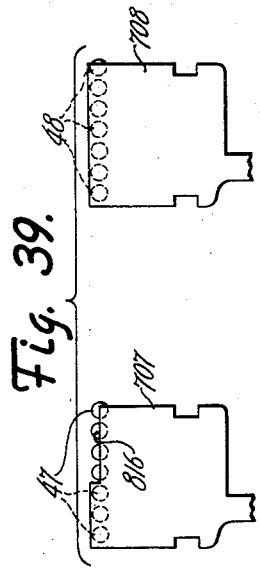
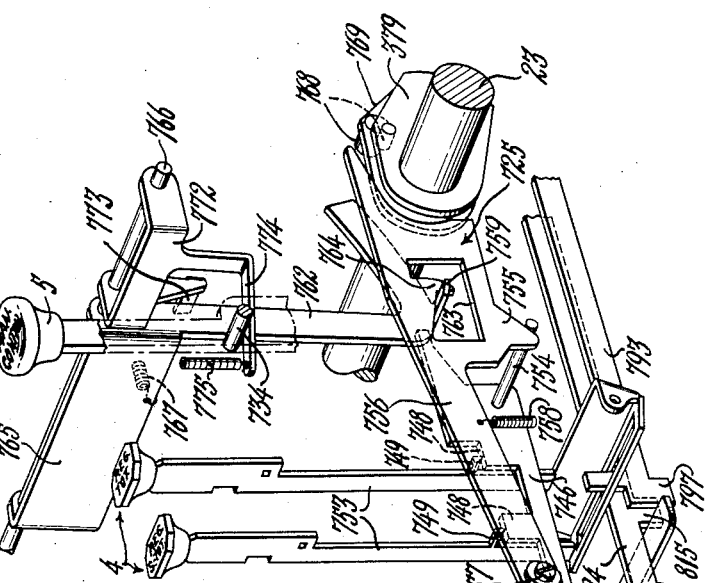
INVENTOR
OSCAR J. SUNDSTRAND
BY
ATTORNEY

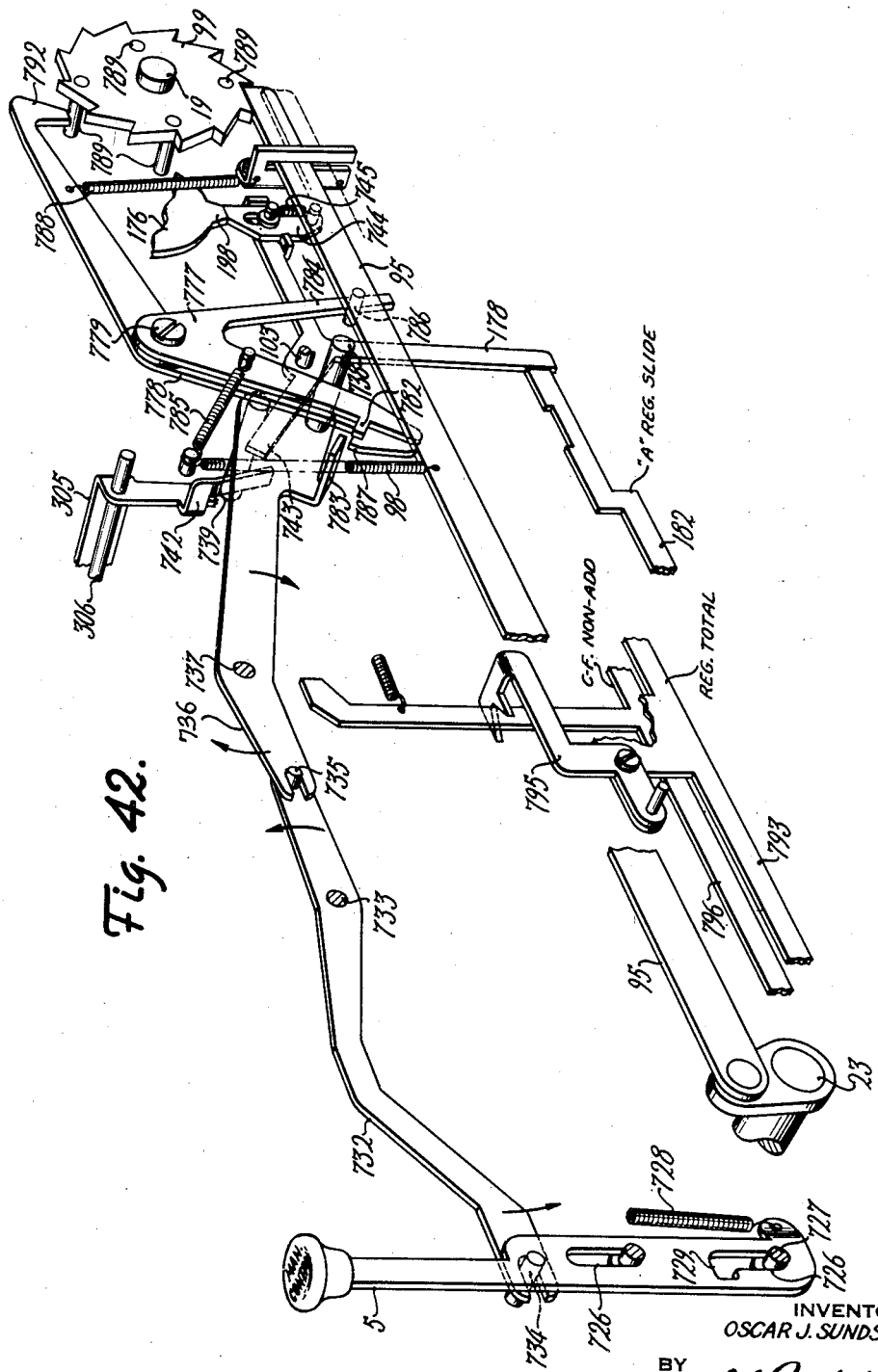

Patented Jan. 18, 1949

2,459,468

UNITED STATES PATENT OFFICE 2,459,468

ACCOUNTING MACHINE

Oscar J. Sundstrand, West Hartford, Conn., assignor to Underwood Corporation, a corporation of Delaware Application June 24, 1941, Serial No. 399,461

13 Claims. (Cl. 235—60.29)

This invention relates to accounting machines and more particularly to a machine for printing, proving and punching public utility company bills.

Utility companies, such as for example, electric power companies, generally render their customers monthly bills showing in kilowatt-hours the previous and present meter readings and the difference between the two, this difference being the consumption of electricity by the user. Many companies find it desirable to use bills of the punched card type such as used by the well-known McBee Keysort System, in which code slots, representative of the "Consumption" amount, are punched in the card to facilitate rapid sorting and analysis for classification of the user.

In performing such billing operations, the "Previous" and "Present" amounts are taken from the meter reader's book, together with his computation of the difference, and are indexed in the accounting machine keyboard by the operator. In this method of billing there is obviously the possibility that either the meter reader or operator has made an error in reading or handling the amounts.

It is accordingly an object of the present invention to provide a machine for receiving separately the several amounts involved in a single transaction of the character above described, for printing the amounts upon the bill or work piece, for automatically computing the amounts to prove the transaction, and further, for automatically punching one of the amounts in the bill if, and only if, the entries are correct.

With this and incidental objects in view, the invention consists in certain novel features of construction and combinations of parts, the essential elements of which are set forth in appended claims, and a preferred embodiment of which is hereinafter described with reference to the drawings which accompany and form part of the specification.

Figure 2:
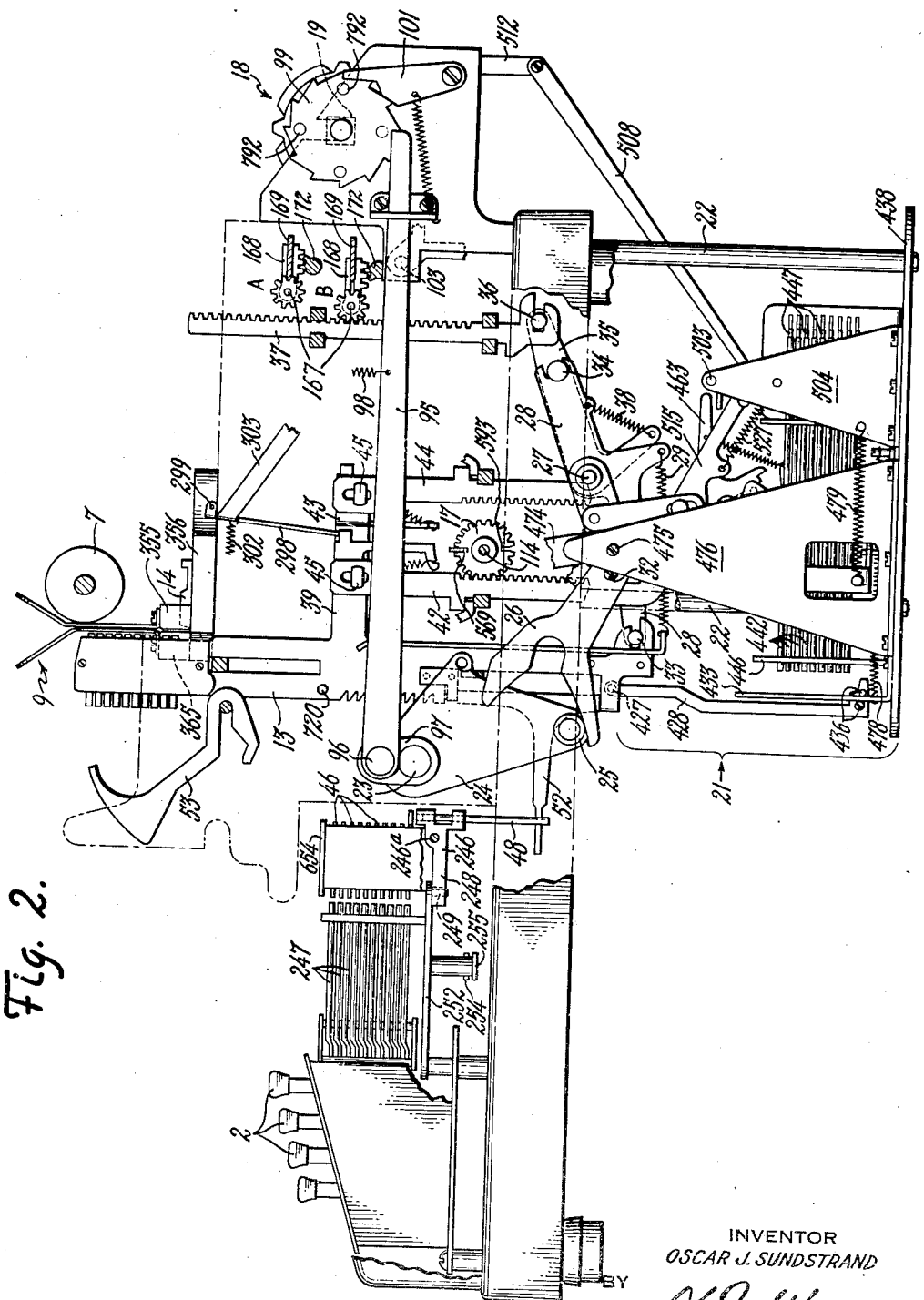
Figure 20:
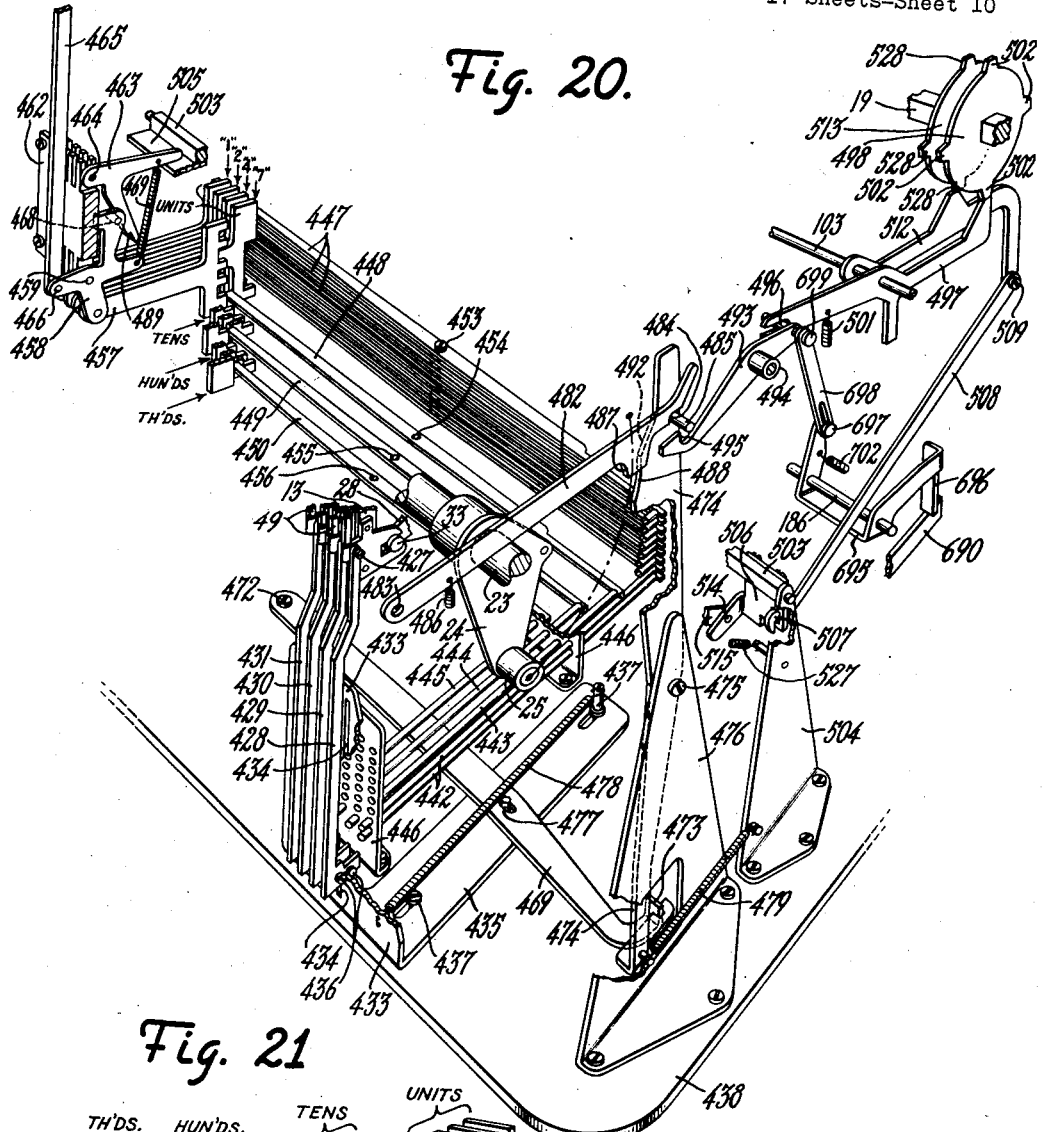
Figure 21:
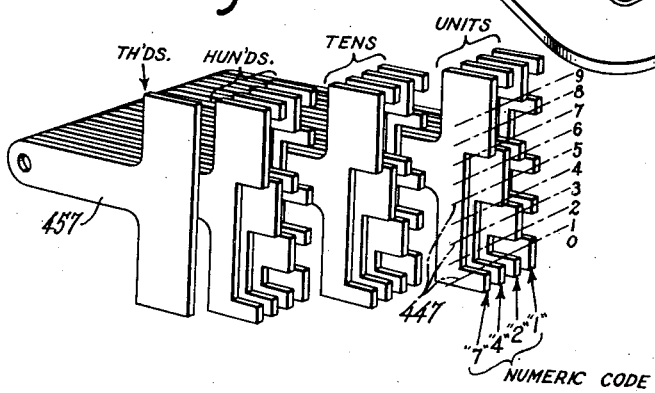

In the drawings:

Figure 1 is a perspective view of an accounting machine embodying the invention, Figure 2 is a right side elevation showing the crossfooter, registers, punch selector mechanism, type bars and actuating mechanism, Figure 3 is a perspective view of the motor and the associated machine cycling mechanism, Figure 4 is a detail front elevation of the motor clutch mechanism, Figure 5 is a diagrammatic plan view of the automatic control cams, Figure 6 is a right side elevation of the crossfooter engaging, actuating and automatic subtraction control mechanism, Figure 7 is a right side elevation of the register selecting, engaging and actuating mechanism, Figure 8 is a perspective view (taken from the right) of the type bars, crossfooter, the actuating racks therefor and the bill count mechanism, Figure 9 is a front elevation of the A and B registers, Figure 10 is a perspective view (taken from the right) of the mechanism for retaining amounts indexed until the appropriate cycle, Figure 11 is a fragmental top plan view of certain parts of the left keyboard amount indexing mechanism and showing its connection with the amount clearing and retention mechanism, Figure 12 is a perspective view (taken from the left) of the tally roll support and platen, the bill chute and an automatic bill locating member, Figure 13 is a left side elevation of certain conventional ribbon lift mechanism that controls operation of the automatic bill locating lever, Figure 14 is a right side elevation of the platen line spacing mechanism in normal position, i. e., at the end of a third machine cycle, Figure 15 is a fragmental view similar to Figure 14 but with the parts shown in the positions which they occupy at the end of the first machine cycle, Figure 16 is a perspective view (taken from the left) showing the manual, "Classification" punch selecting mechanism together with latch and restoring means therefor, Figure 17 is a detail left side elevation showing the connection of certain parts of the manual punch latch restoring mechanism, Figure 18 is a detail left side elevation of the manual punch latch slide, Figure 19 is a right side elevation of the punch actuating mechanism and the automatic punch selector latches, the parts being shown in the positions they occupy just prior to a punching operation, Figure 20 is a perspective view (taken from the right) showing the "Consumption amount," punch selecting mechanism and the automatic controls therefor, Figure 21 is a detail perspective view (taken from the left) of the "Consumption amount" punch selector slides, Figure 22 is a right side elevation of the "Consumption amount" punch selector latch restoring mechanism in normal position, i. e., at the end of a third machine cycle.

Figure 26:
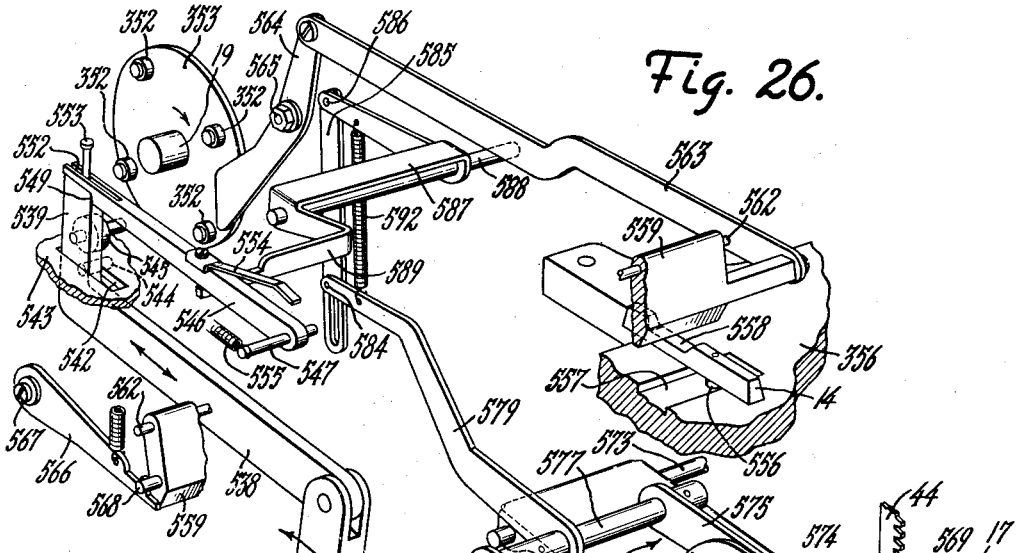
Figure 28:
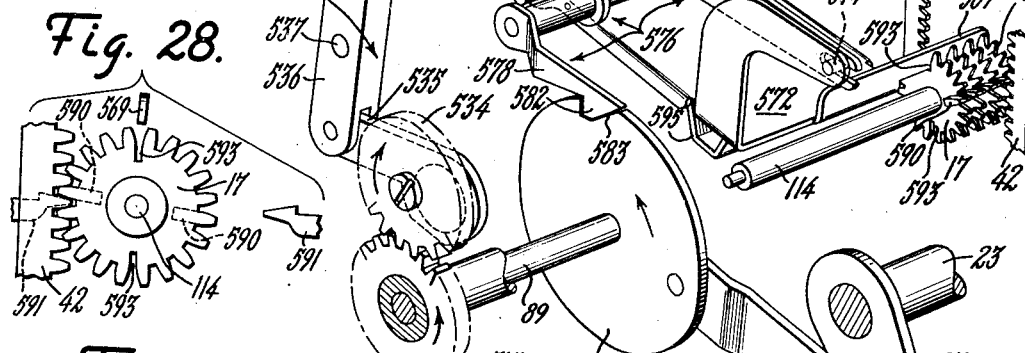
Figure 27:
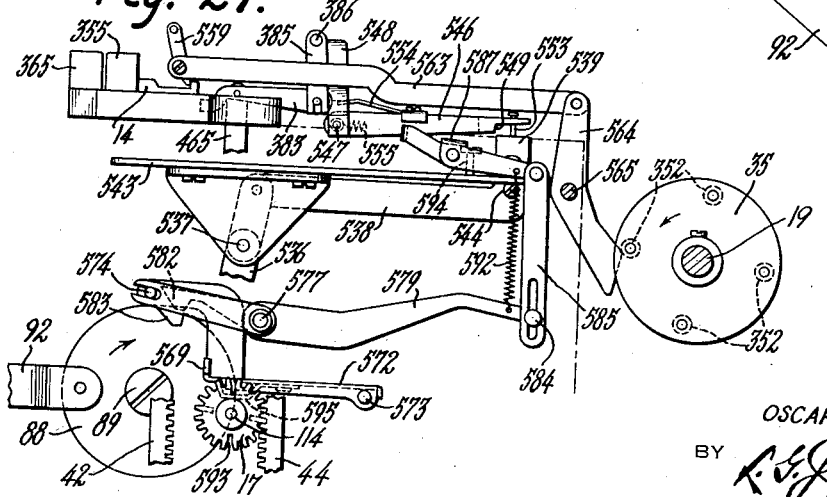

Figure 23 is a view similar to Figure 22, with the parts shown in the positions that they occupy midway of the first half of the first machine cycle, Figure 24 is a view similar to Figure 23 but with the parts shown in the positions that they occupy at the end of the first half of the first cycle, Figure 25 is a view similar to Figure 24 but with the parts shown in the positions that they occupy at the end of a first machine cycle, Figure 26 is a perspective view (taken from the left) showing the punch actuating and restoring mechanism and the automatic proof control for the punch actuating mechanism, the parts being shown in the positions they occupy after the completion of a third machine cycle and the punches having been actuated, Figure 27 is a right side elevation of the mechanisms shown in Figure 26 but with the parts shown in the positions that they occupy at the end of a first machine cycle, Figure 28 is a detail right side elevation of a crossfooter wheel, Figure 29 is a perspective view (taken from the left) of the automatic bill ejecting mechanism with the parts shown in the positions that they occupy prior to ejection of a bill, Figure 30 is a left side sectional elevation of the ejecting mechanism with the parts shown in the positions that they occupy after the ejection of a bill, Figures 31 and 32 are similar detail elevations of certain parts shown in Figures 29 and 30, showing the movement of these parts during an ejecting operation, Figure 33 is a diagrammatic view of a printed and punched bill together with a tally showing normal and various other billing operations, Figure 34 is a view similar to Figure 33 but showing a dual meter reading billing operation, Figure 35 is a right side elevation of a non-count key and associated parts, Figure 36 is a perspective view (taken from the left) showing certain of the parts shown in Figure 35 together with mechanism for effecting dual line printing upon the bills, Figure 37 is a detail right side elevation of the type bars showing the arrangement of certain hammer release mechanism for enabling independent printing of zeros by the units order bars, Figure 38 is a perspective view (taken from the right) showing certain blank cycle enforcing mechanism and its connection with the manual control key, conventional type bar detents, an auxiliary zero printing detent and the crossfooter and register total key control for these detents, Figure 39 is a detail plan view showing the conventional detents in normal position, Figure 40 is a view similar to Figure 39 but with the detents shown in their moved positions, Figure 41 is a fragmental detail right side elevation of the register and crossfooter total slides and their connection with the detent control, and, Figure 42 is a perspective view (taken from the right) of the manual control key and associated mechanisms for disabling automatic control of the machine.

General description

In many respects the present machine is similar to the one disclosed in U. S. Patent No. 2,194,270 to Oscar J. Sundstrand. The machine includes a keyboard having punch setting keys, operation controlling keys and two groups (left and right) of amount keys. The machine has a chute for supporting front fed forms or bills and a stationary carriage having a platen for supporting rear fed paper. It has three totalizers, which, in the following description will be referred to as the crossfooter and registers A and B, the crossfooter being capable of adding and subtracting, and the registers being capable of adding only. Registers A and B are divided into two sections, making each capable of accumulating two separate amounts.

The machine has the usual type bars and associated actuators that are adjustable under the control of stops set by the amount keys. The actuators associated with the left group of amount keys are arranged to add amounts entered in that group in the crossfooter and the left sections of the A and B registers and the actuators associated with the right group of amount keys are arranged to subtract amounts entered in that group from the crossfooter and add said amounts in the right section of the B register. A series of control cams that are rotated during each machine cycle, automatically control the various machine operations that may be initiated manually by the keyboard. A key is provided for conditioning the machine for automatic control by the cams, or manual control by the keys.

A series of punches is provided, certain of which are automatically set for punching code slots in the bill corresponding to one of the amounts entered on the left group of amount keys, and others of which are manually set by the punch setting keys for punching slots designating various classifications. Sensing mechanism under the control of the crossfooter and a part of the machine cycling mechanism is provided so that all of the set punches will be actuated upon the completion of a billing operation if the proper amounts are entered.

The machine is started by depression of a motor bar. In a single billing operation, the motor bar is depressed twice, the first depression causing the machine to cycle once, and the second depression causing the machine to cycle twice. Hereinafter these cycles will be referred to as the first, second and third machine cycles.

In order that the following description may be more readily understood, a skeleton outline of the sequence of machine operations in rendering a bill for an electric power consumer will now be given. It will be understood that the choice of an electric power company as a user of the machine is illustrative only and simply gives a typical example of one of the many uses to which the machine is adapted. In such billing operations, the (kilowatt-hour) "Consumption" amount is indexed in the left amount keyboard and the motor bar depressed to initiate the first machine cycle. During this cycle the "Consumption" amount is printed on a tally strip and added in the crossfooter and in the left section of the A register. Also during this cycle, a bill count of "1" is automatically effected in the right (counter) side of the A register, and punches representative of the "Consumption" amount are automatically set, ready to punch the code slots in the bill. Following this first cycle, the bill is inserted in the chute, the manually controlled classification punches are set, the "Previous" and "Present" meter reading amounts are indexed in the left and right amount keys, respectively, and the motor bar is depressed to initiate the second cycle. During this cycle the "Previous" amount is printed on the bill and added in the crossfooter and in the left section of the B register. The "Present" meter reading amount is held indexed in the keyboard but is non-printed and non-accumulated during this second cycle. During the third cycle, the "Present" meter reading amount is printed upon the bill, is added in the right section of the B register, and is subtracted from the crossfooter.

Following the third machine cycle, if the crossfooter is cleared, as it will be if the amounts entered are correct (i. e., if the total of the "Consumption" and "Previous" amounts equals the subtracted "Present" amount) the punches will be automatically actuated to punch slots representative of the "Consumption" amount and the classification in the bill. Following this punching, the bill is automatically ejected.

At the end of a day's billing, the machine is conditioned for manual control by depressing the manual control key. Thereupon, totals of the "Consumption" amounts and the bill count are taken from the A register. Likewise, totals of the "Previous" and "Present" meter readings are taken from the B register.

DETAIL DESCRIPTION

INDEX OF TOPICS

1. The machine sections and actuating mechanism.
2. The machine cycling mechanism.
3. Crossfooter engagement and actuation.
4. Register selection, engagement and actuation.
5. Bill counter.
6. Mechanism for retaining indexed amounts in the indexing mechanism.
7. Releasing "present" amount type bars.
8. Paper supporting and feeding apparatus.
9. Punch mechanism generally.
10. Manual punch selecting and latching mechanism.
11. Automatic punch selecting and latching mechanism.
12. Punch actuating mechanism.
13. Automatic proof control for punch actuating mechanism.
14. Automatic bill ejecting mechanism.
15. Normal billing operation.
16. Dual meter reading bills.
17. Duplicate bills.
18. Printing zeros.
19. Manual operation control key.
20. Taking totals.
21. Correcting errors.

1. *The machine sections and actuating mechanism.*

Referring to Figure 1, the machine includes the customary keyboard having two sets (left and right) of amount keys 1 and 2, punch setting keys 3, operation controlling keys 4, a manual control key 5 and a motor bar 6. The machine has a roller platen 7 around which a tally 8 is fed, a chute 9 being provided in front of the tally for receiving bills or work sheets from a supply magazine 12 for printing by type bars 13.

A series of punches such as 14 (Figure 2) located to the rear of an aperture 15 (Figure 1) are arranged to punch slots in the lower edge of the bill. A removable container 16 is provided to receive the punchings.

The machine also has two registers designated A and B in Figure 2. Each register is comprised of a plurality of ten-tooth wheels and each is divided so as to constitute in effect two separate registers (see Figure 9). The registers are operable for addition only.

Situated in front of the registers is a crossfooter 17 having a plurality of twenty-tooth wheels capable of both addition and subtraction.

The machine is arranged to be normally under the automatic control of cams indicated generally at 18 (see also Figure 5), mounted upon a cam shaft 19 that is normally rotated during the second half of each machine cycle. Automatic control by cams 18 may be disabled and manual control by keys 4 enabled by depression of the manual control key 5.

The mechanism for automatically selecting punches 14 for actuation is indicated generally at 21 and is suspended by posts 22 from the base of the machine.

The machine is operated by an actuating shaft 23 that is arranged to be rocked first counterclockwise and then clockwise during each cycle of the machine under the control of the machine cycling mechanism, to be later described.

Two similar arms 24, only one of which is shown, are secured to drive shaft 23 and are each provided with rollers such as 25, that rest in cam slots in the forward ends of two similar arms such as 26, pivoted on a rod 27 and situated on opposite sides of type bars 13. A series of actuating levers such as 28, there being a lever for each type bar, are pivoted on rod 27 between arms 26 and are tensioned clockwise about the rod by springs such as 29 so that the upper edges of the levers rest against a tie rod 32 secured between arms 26. The forward ends of levers 28 are each pivoted at 33 to their corresponding type bars 13 which are guided for vertical movement in the machine frame. The rear end of each lever 28 is connected by pin and slot connection 34 to a bell crank 35 also pivoted on rod 27 adjacent each actuating lever. The rear ends of bell cranks 35 are pivoted at 36 to corresponding register actuating racks 37 guided for vertical movement in the machine frame. Springs such as 38 connected between each bell crank and lever, normally tension the bell cranks counterclockwise about rod 27 so that the pins of the pin and slot connections 34 are urged toward the upper edges of the slots for effecting a transfer from one order to the next higher order as disclosed in Patent 2,194,270. Referring to Figure 9, it will be noted that transfer lugs on the middle wheel of each group in the A and B registers are omitted, thus dividing each register into two separate and independent sections hereinafter referred to as the left and right sections.

Type bars 13 are divided into two groups indicated as "Consumption and Previous" and "Present" in Figure 8. The left or "Consumption and Previous" group of type bars is associated with the left set of amount keys 1 (Figure 1) whereas the right or "Present" group is associated with the right set of amount keys 2. Rearward projections 39 (Figures 2 and 8) on the right group of type bars support a series of subtracting racks 42 on one side of the crossfooter wheels 17 and similar but longer and offset projections 43 on the left group, support a series of adding racks 44 on the opposite side of the crossfooter. The usual pin and slot connections 45 are provided between the racks and the projections for transfer purposes, the transfer mechanism being identical with that disclosed in the before-mentioned Patent 2,194,270.

Operation of the machine causes arms 24 and 26 (Figure 2) to be raised and lowered during each cycle. As rod 32 rises during the first half of the cycle, actuators 28 raise such of the type bars 13 as are free to rise under tension of springs 29 and corresponding crossfooter actuating racks 42 and 44 rise therewith while the corresponding register actuating racks 37 are simultaneously lowered. As rod 32 descends, during the second half of the cycle, the actuators are restored, restoring the type bars and racks to the normal position shown in Figure 2. The extent of vertical movement of the type bars and racks is controlled by stops 46 that are moved by amount keys 1 and 2 into the path of vertically disposed rods 47 and 48 (see Figure 8) connected to the forward ends of arms 49 and 52 that are pivoted to the left and right groups of type bars 13, respectively. Printing is effected by hammers 53 (Figure 2) that are tripped shortly after all the bars have risen to their fullest extents as determined by the amounts indexed on the keyboards, to strike impression type carried by the type bar. It will be noted that, by the offset projections 43 and location of adding racks 44, amounts indexed in the left set of amount keys 1 will be added on the crossfooter whereas amounts entered in the right set of amount keys 2 will be subtracted in the crossfooter.

2. *The machine cycling mechanism*

For reasons which will hereafter appear, a single billing operation requires three machine cycles, the first and second of which are initiated manually and the third of which is initiated automatically. This sequence of cycles is continuous during all normal or billing operations, and the following mechanism is provided to effect its accomplishment.

Referring to Figure 3, the machine is driven by an electric motor 55. The motor is started by the closing of a suitable switch mechanism (not shown) upon depression of motor bar 6. Depression of the motor bar also releases a clutch mechanism 56 (see also Figure 4) to engage the motor with actuating shaft 23.

The motor bar 6 is mounted in the machine frame for vertical movement and is held in its upper position by a spring 57. A bell crank 58 pivoted at 59 to the machine frame has one of its arms pivoted at 62 to the stem of the motor bar and its opposite arm pivoted at 63 to one end of a link 64 extending toward the rear of the machine. A shoulder 65 on link 64 lies behind a block 66 on another link 67 connected at its forward end to an arm 68 secured to a shaft 69 extending across the front of the machine. An arm 72, also secured to shaft 69, is pivoted to a link 73 connected at its rear end by pin and slot connection to a stud 74 secured to a plate 75 fixedly attached to a shaft 76. An arm 77 secured to shaft 76 normally lies above a shoulder 78 on a cam 79 on a release sleeve 82. A spring 83 secured to plate 75 normally holds these parts in the positions shown. An arm 84 extends upwardly from plate 75 and is connected to a link 85 extending toward the rear of the machine. Depression of the motor bar rocks lever 58 and pulls link 64 forward. Shoulder 65 pulls link 67 forward, rocking shaft 69 and pulling link 73 and plate 75 forward against the tension of spring 83. This rotates shaft 76, removing arm 77 from shoulder 78 and moves link 85 to the rear. The removal of arm 77 from shoulder 78 permits clutch 56 to engage under the tension of a spring 86 (Figure 4); and the movement of link 85 starts the electric motor in the manner disclosed in Patent No. 2,194,270. The starting of the motor, together with the engaging of the clutch, through a worm and worm gear drive 87, imparts rotation to a disk 88 secured on one end of a shaft 89, the opposite end of the shaft being keyed for rotation with the driven element of clutch 56. A link 92 connected between disk 88 and a crank arm 93 secured on shaft 23 rocks shaft 23 first counterclockwise, and then clockwise about 90° during each cycle of the machine as previously described. Toward the end of the machine cycle shoulder 78 is again engaged by arm 77 under tension of spring 83 which restores the parts to normal position upon release of motor bar 6, thus disengaging the driven element of clutch 56 from the driving element thereof and ending the cycle. The first and second machine cycles previously referred to are initiated by depressing motor bar 6 as above described.

The third cycle is automatically initiated under the control of a motor repeat cam 94 secured on cam shaft 19. A pawl 95 is pivoted at 96 to an arm 97 secured on actuating shaft 23. The opposite end of pawl 95 is held under tension of a spring 98 in engagement with teeth of a twelve-toothed ratchet wheel 99 secured to shaft 19. During each oscillation of shaft 23, pawl 95 engages a tooth of the ratchet wheel and rotates shaft 19 and cam 94 one-twelfth of a revolution. A stop pawl 101 (Fig. 2) holds ratchet 99 against improper rotation. A bell crank 102 pivoted on a rod 103 in the machine frame has a horizontal arm 104 lying beneath cam 94, and a vertical arm engaging a link 105. The forward end of link 105 is pivoted by a pin and slot connection 106 to one side of a bail 107 pivoted on a rod 108 stationary in the machine frame. The opposite side of bail 107 is pivoted at 109 to the rear end of link 67. A spring 112 connected to link 105 tensions the link rearwardly and arm 104 upwardly against cam 94. At the end of the third machine cycle, the parts rest in the positions shown in Figure 3.

Upon rotation of shaft 19 during the second half of a second machine cycle, one of four cam surfaces 113 on cam 94 cams arm 104 downwardly, rocking bell crank 102 clockwise and thrusting link 105 forwardly. Forward movement of link 105 rocks bail 107 and thrusts link 67 forward to initiate the third machine cycle automatically. During the second half of this third cycle, pawl 95 rotates shaft 19 removing cam surface 113 from over arm 104, whereupon the parts restore to the positions shown in Figure 3 under tension of spring 112, and so on.

3. *Crossfooter engagement and actuation*

Crossfooter 17 is engageable with either adding racks 44 or subtracting racks 42, the mode of operation of the present invention requiring its engagement with the adding racks during the latter portion of the first and second machine cycles and with the subtracting racks during the latter portion of the third cycle. The wheels of the crossfooter are rotatably mounted on a shaft 114. Shaft 114 is shiftable bodily from its left position where the wheels mesh with subtracting racks 42, toward the right, to an intermediate position where the wheels are disengaged from both sets of racks and thence further to the right where the wheels engage the adding racks 44.

Referring now to Figure 6, the crossfooter engaging mechanism includes an actuating arm 115 secured to actuating shaft 23. A spring tensioned pawl 116 pivoted on arm 115 has two shoulders 117 and 118, the shoulder 117 engaging a pin 119 fixed on a plate 122 pivoted at 123 to the machine frame. Plate 122 is connected by a pin and slot connection 124 to a lever 126 pivoted on a rod 127. A spring 128 normally tensions lever 126 counterclockwise about rod 127. Lever 126 carries a pin 129 engageable by shoulder 118 of pawl 116. A stud 132 fixed on plate 122 is embraced by a notch 134 in the rear edge of a pendent 135. The upper end of pendent 135 is pivoted at 136 to a rocker 137 pivoted on a stationary rod 138. Another pendent 139 pivoted at 142 on the opposite end of rocker 137 has a notch 143 embracing a stud 144 fixed in a cam lever 145 pivoted at 146 in the machine frame. Lever 145 has a cam slot 147 embracing a roller 148 secured on a lever 149 pivoted at 152 in the machine frame. The lower end of lever 149 is pivoted at 153 to one of a pair of identical arms 154 between which crossfooter shaft 114 is supported. At the end of the third machine cycle (i. e., the end of a billing operation) the parts are in the positions shown in Figure 6 with crossfooter 17 engaging subtraction racks 42 and roller 148 lying in the upper end of slot 147. Upon depression of the motor bar to initiate the first cycle of a billing operation, as arm 115 swings counterclockwise, shoulder 117 rotates plate 122 counterclockwise raising pendent 135 and lowering pendent 139. This movement of the parts causes lever 145 to oscillate sufficiently to move the crossfooter to a position equidistant from both sets of racks 42 and 44, roller 148 now lying in the intermediate portion of slot 147. At this time, a notch 155 in the right edge of pendent 139 lies opposite a pin 156 in lever 145 and pendent 139 is swung toward the right so that notch 143 disengages from pin 144 and notch 155 engages pin 156 under the tension of a spring 157 connected to a subtract slide 158. Slide 158 carries a pin 159 bearing against one arm of a yoke 162 connected to the slide by a spring 160. Yoke 162 is pivoted at 163 in the machine frame, and has another arm connected by pin and slot connection 163' with pendent 139 to transmit movement of slide 158 to pendent 139. At the beginning of the second half of this cycle, as arm 115 swings clockwise, shoulder 118 engages pin 129 and rotates plate 122 in a clockwise direction lowering pendent 135 and raising pendent 139. Since notch 155 now engages pin 156, lever 145 oscillates further counter-clockwise and the lower portion of slot 147 cams lever 149 sufficiently in a counter-clockwise direction to bring crossfooter 17 into mesh with adding racks 44. During the next or second machine cycle, notch 155 remains in engagement with pin 156 consequently, as pendent 139 is lowered and raised at the beginning of the first and second half of this cycle, respectively, crossfooter 17 will be disengaged from racks 44 at the beginning of the cycle and reengaged therewith at the beginning of the second half of the cycle.

A subtract cam 164 secured on shaft 19 has four cam surfaces 165. During the second half of this second cycle cam 164 will have been rotated sufficiently to cause one of the surfaces to cam a bell crank 166 pivoted on rod 103, clockwise. A vertical arm of bell crank 166 lies behind the rear end of subtract slide 158 and clockwise movement of the bell crank thrusts the slide forward withdrawing pin 159 from the shoulder on yoke 162. This movement stretches spring 160 and tensions yoke 162 clockwise about pivot 163 and, through the pin and slot connection 163', tensions the left edge of pendent 139 against pin 144, notch 155, however, still remaining in engagement with pin 156. Upon initiation of the third cycle by motor repeat cam 94 as described in the preceding section, as pendent 139 is lowered, crossfooter 17 is withdrawn from engagement with adding racks 44 to neutral position and when pin 144 comes in alignment with notch 143 pendent 139 shifts clockwise under tension of spring 160 so that notch 155 disengages from pin 156 and notch 143 engages pin 144. At the beginning of the second half of this cycle as pendent 139 is raised, lever 145 is oscillated sufficiently in a clockwise direction to engage crossfooter 17 with subtraction racks 42 as shown in Figure 6. During this second half of this cycle rotation of cam shaft 19 by pawl 95 removes the effective cam surface 165 from over bell crank 166 whereupon spring 157 through yoke 162 tensions the right edge of pendent 139 against pin 156, notch 143, however, remaining in engagement with pin 144 until the beginning of the first cycle of the next billing operation, as described in the beginning of this section. At the beginning of this next first cycle, when notch 155 engages pin 156, slide 158 moves to the right under tension of spring 157 swinging bell crank 166 into effective relation with cam 164 ready for actuation by the next cam surface 165.

From the foregoing it is noted that at the beginning of a machine cycle when type bars 13 and racks 42 and 44 rise, differentially in accordance with the amounts indexed on the amount keys 1 and 2, crossfooter 17 is disengaged from the racks, and that at the beginning of the second half of the cycle the crossfooter is engaged with the racks. As the racks restore, the crossfooter wheels are rotated clockwise or counter-clockwise to add or subtract the amount printed on or from the crossfooter.

With the exception of the operation of subtract slide 158 through the medium of cam 164 and bell crank 166, the crossfooter engaging and actuating mechanism above described is identical with that disclosed in the before-mentioned Patent 2,194,270.

*4. Register selection, engagement and actuation*

Each register (Figure 2) is composed of a number of ten-tooth wheels rotatably mounted on shafts 167 situated one above the other. Shafts 167 are supported at their opposite ends in brackets such as 168 slidably mounted for horizontal movement on cross bars 169 fixed in the machine frame. The under side of brackets 168 are toothed and mesh with corresponding teeth on shafts 172 journaled at their opposite ends in the machine frame. Crank arms 173 (Figure 7) are secured to the outer ends of shafts 172 and are oscillated in a manner to be later described to engage and disengage the selected registers with and from racks 37.

When the machine is conditioned for manual control by depression of manual control key 5 (Figure 1), the registers may be selected manually by depression of A and B register selecting keys 174 and 175, respectively. This mode of selection is used when totals are to be taken from the registers. In normal or billing operations, however, the registers are automatically selected under the control of cams 176 and 177 secured on shaft 19 for selecting the A and B registers, respectively. Bell cranks 178 and 179 pivoted on rod 183 have horizontal arms lying beneath cams 176 and 177 and depending arms lying behind slides 182 and 183 that extend forwardly and are suitably mounted for sliding movement in the machine frame. At their rear ends slides 182 and 183 have upstanding projections lying directly behind downwardly extending shoulders on bails 184 and 185 pivoted on a rod 186. At their opposite sides bails 184 and 185 have pivoted thereto, upstanding links 187 and 188 which in turn are each pivoted by pin and slot connections 189 to engaging links 192 each of which are pivoted at their rear ends to crank arms 173. Springs 193 are connected to each engaging link and to the machine frame to hold the forward ends of the links up against studs 194 and 195 secured in a member 196. Springs 197, superior in strength to the springs 193, are connected to each of the bails 184 and 185 and normally tension the bails counter-clockwise about rod 186 withholding arms 192 from engagement with pins 194 and 195 and holding the horizontal arms of bell cranks 178 and 179 in cooperative relation with cams 176 and 177.

Figure 7 shows the parts in the positions that they occupy at the end of the third machine cycle, i. e., with the B register remaining selected and engaged and the A register selected for engagement during the next first machine cycle. In this position it will be observed that one of four cam surfaces 198 on A register cam 176 cams bell crank 178 clockwise, thrusting slide 182 to the left. This movement rocks bail 184 clockwise against the tension of its spring 197 and raises link 187 so that engaging link 192 is free to rise under the tension of its spring 193 when pin 194 is moved in alignment with a notch 199 in the forward end of the link during the first machine cycle. Link 192 associated with the B register train will be disengaged from pin 195 during this cycle, however, because bell crank 179 was not cammed into effective position during the latter portion of the preceding third machine cycle. During the second half of this first machine cycle, the cams 176 and 177 are rotated sufficiently to remove a cam surface 198 from over bell crank 178 and to bring one of four cam surfaces 202 on cam 177 into camming engagement with bell crank 179 thereby actuating slide 183, bail 185 and link 188 to effect selection of the B register for engagement during the next or second machine cycle. During the second half of this second machine cycle, cams 176 and 177 are further rotated and the B register is held selected for engagement during the next or third machine cycle by extended dwells on the cam surfaces 202 but this rotation of shaft 19 is insufficient to bring the next cam surface 198 of cam 176 into effective engagement with bell crank 178 consequently the A register remains unselected. During the second half of the third machine cycle, cams 176 and 177 are further rotated a sufficient distance to remove a cam surface 202 from over bell crank 179 and to cause a cam surface 198 to cam bell crank 178 into effective position to select the A register as shown in Figure 7, and so on.

The mechanism for engaging the selected register with adding racks 37 includes a spring tensioned pawl 200 pivoted on the right actuating arm 24 and having two shoulders 203 and 204, the shoulder 203 engaging a pin 205 fixed on a plate 206 pivoted at 207 to the machine frame. Plate 206 is connected by a pin and slot connection 208 to a lever 209 pivoted on rod 127. A spring 212 normally tensions lever 209 counter-clockwise about rod 127. Lever 209 carries a pin 211 engageable by shoulder 204 of pawl 200. A stud 213 fixed on plate 206 is embraced by a notch 214 in the rear edge of a pendent 215. The upper end of pendent 215 is pivoted at 216 to a lever 217 pivoted on rod 138. The rear end of lever 217 is provided with a cam slot 218 embracing a stud 219 on member 196. This member is mounted for horizontal movement forwardly and rearwardly of the machine by being suspended from the machine frame on two links 222 and 223 pivoted to the front and rear ends of member 196 and to the machine frame. As heretofore mentioned, studs 194 and 195 are secured in member 196 to move forwardly and rearwardly of the machine with the member.

At the beginning of a machine cycle, as arm 24 swings counter-clockwise, shoulder 203 rotates plate 206 counter-clockwise raising pendent 215 and lowering cam slot 218 and camming member 196 to the rear so that pins 194 and 195 are brought into alignment with notches 199 in the engaging links 192 of the A and B registers. At this point in the cycle, the link 192 of the selected register rises as above described so that its notch 199 engages with its corresponding pin 194 or 195 under the tension of its spring 193 thus completing the selection of the register. At the beginning of the second half of a cycle, as arm 24 swings clockwise, shoulder 204 engages pin 211 and rotates plate 206 in a clockwise direction lowering pendent 215 and raising cam slot 218 to cam member 196 forwardly. The forward movement of member 196 pulls link 192 of the selected register forward, which in turns rocks its corresponding arm 173 and shaft 172 counter-clockwise to shift the selected register into engagement with the adding racks 37.

During the remainder of return movement of arm 24 the parts 206, 215, the engaging links, etc., are not moved so that at the end of the cycle the register selected and engaged for that cycle remains engaged as shown in Figure 7 (see B register Figure 2). At the beginning of the next cycle, the initial counter-clockwise movement of plate 206 disengages the selected register by movement of its engaging link 192 to the rear. If this register is not again selected for this cycle, as soon as the engaging link reaches its rearmost position, springs 197 attached to bails 184 and 185 pull their corresponding bail counter-clockwise about pivot 186. At this time the bail is free to be rocked in this direction since its corresponding slide 182 or 183 is not pushed forward by its corresponding cam 176 or 177.

Actuation of the register occurs during the latter half of the machine cycle, the engagement of the registers taking place just after racks 37 are lowered. As before stated, the amount of movement imparted to the racks is determined by stops set by indexing an amount on the amount keys 1 and 2. As the type bars descend, following printing by hammers 53, racks 37 rise, rotating the wheels of the engaged register clockwise to add the amount printed thereon.

Selection and engagement of the registers for taking totals at the end of a day's billing operations, will be later described.

With the exception of the operation of slides 182 and 183 through the medium of cams 176 and 177 and bell cranks 178 and 179, the register selecting, engaging and actuating mechanism above described is identical with that disclosed in the afore-mentioned Patent 2,194,270.

5. Bill counter

The right section of the A register is used to consecutively count the number of billing operations performed. Each billing operation requires three machine cycles and the count of each bill is arranged to be effected on the first of these cycles.

Referring to Figure 8, the bill counting mechanism includes a conventional transfer slide 224 (similar to transfer slides 367 shown in Patent 2,194,270) situated to the right side of the units order rack 37 of the right section of the A register. As previously stated, springs 38 normally tension bell cranks 35 counter-clockwise and racks 37 upwardly. The racks are held from rising an additional step of movement by bell cranks 225 pivoted on a rod 226. Horizontal arms of bell cranks 225 have flanges 227 engaging lugs 228 on racks 37 and vertical arms of the bell cranks have flanges 229 engaging shoulders 232 on slides 224. Springs 233 tension bell cranks 225 in a counter-clockwise direction to permit the additional step of movement to racks 37, but shoulders 232 restrain this movement. Springs 234 tension slides 224 downwardly and hold shoulders 232 in the plane of flanges 229. A lug 235 on the rear edge of the units rack transfer slide 224 lies immediately above a flange 236 formed on a lever 237 pivoted on a stud 238 secured in the machine frame. A spring 239 superior to spring 234 of the units order transfer slide 224, normally tensions lever 237 clockwise about stud 238 but a flange 242 on the rear end of lever 237 bears against the periphery of a bill count cam 243 and restrains lever 237 against such movement. Cam 243 has four spaced notches 244 in its periphery, one side of each notch being beveled for camming purposes hereafter to appear. At the end of a billing operation, i. e., at the end of a third machine cycle, the parts are in the positions shown in Figure 8.

On the next billing operation, during the second half of the first machine cycle, cam 243 rotates a sufficient distance to move a notch 244 past flange 242, flange 242 entering the notch under tension of spring 239 and being cammed out of the notch by the beveled side of the notch during this movement. This oscillates lever 237 about rod 238. During the clockwise movement of the lever, flange 236 raises slide 224 a sufficient distance to remove shoulder 232 from behind flange 229. This permits bell crank 225, associated with the units order rack 37, to rock counter-clockwise under tension of its spring 233 whereupon units rack 37 rises one step of movement under the tension of its spring 38, to add "1" upon the units wheel of the right section of the A register, it being remembered that the A register is engaged at the beginning of the second half of the first machine cycle as previously described.

The units rack bell crank 225 is reset to initial position by a cross bar 245. Cross bar 245 is similar to cross bar 370 in Patent 2,194,270 and likewise is swung in a clockwise direction during the fore part of the next or second machine cycle under the control of mechanism fully disclosed in that patent, to restore the conventional transfer mechanism.

The bill count of "1" is effected on the first machine cycle only, parts 237 and 224 remaining inoperative during the second and third machine cycles because cam 243 is not rotated a sufficient distance during the second halves of these latter cycles to bring a notch 244 into cooperative relation with flange 242. The parts rest in the position shown in Figure 8 at the end of the third cycle, ready to effect a count of "1" on the first machine cycle of the next billing operation.

6. Mechanism for retaining indexed amounts in the indexing mechanism

Ordinarily on machines of this character, an amount entered on the amount keys is cleared from their associated indexing mechanisms at the end of the cycle immediately succeeding its entry. The three cycle mode of operation of the present invention, however, requires certain amounts entered on amount keys 1 and 2 to be retained in the indexing mechanisms until the appropriate machine cycle for their printing and accumulation.

To expedite billing operations, it is desirable to enter the "Consumption" amount of the next bill upon the left set of amount keys 1 during the third cycle of a preceding billing operation and it is necessary, therefore, to retain said amount indexed, ready for printing and accumulation on the first machine cycle of the next billing operation. Likewise, because the "Previous" and "Present" amounts are entered concurrently on keys 1 and 2 respectively, before initiating the second machine cycle and the "Previous" amount only is printed and accumulated during this cycle, it is necessary also to retain the "Present" amount indexed throughout the second cycle and until the end of the third (automatically initiated) cycle for printing and accumulation during the latter. The mechanism for retaining these amounts indexed in this manner will now be described.

Each set of amount keys 1 and 2 has identical indexing mechanism. Each indexing mechanism includes settable stops 46 (Figures 2 and 11) which, as before stated, are moved into the path of pins 47 and 48 (see also Figure 8) by depression of their corresponding amount keys 1 and 2. Pins 47 and 48 lie just behind the stops and are normally positioned to the left thereof as viewed in Figure 11, each group of pins being guided for vertical movement in openings in separate, transversely movable slides 246 mounted on a rod 246a. Depression of keys 1 and 2 thrust rods such as 247 rearwardly setting the stops. Each slide 246 is provided with a forwardly extending projection such as 248, having a pin and slot connection 249 with separate corresponding swinging brackets 252 and 253 in which rods 247 are slidably mounted.

Through an escapement mechanism (not shown) associated with each slide 246, bracket 252 and 253, and each set of keys 1 and 2, indexing of a number by these keys as above described allows the corresponding slide, bracket and rods to move step by step toward the right (Figure 11), one step for each digit indexed, and thereby move pins 47 or 48 (Figure 8) under the rear ends of the stops 46 set by the amount keys. In Figure 11, which shows the indexing mechanism that is associated with the left set of amount keys 1, pins 47 are shown moved two steps to the right, and two corresponding stops 46 have been set. Hence, as the machine is cycled, and type bars 13 (Figures 2 and 8) rise, pins 47 strike against the differentially set stops 46, in which position corresponding type characters in the upper ends of the type bars are brought into printing alignment with platen 7. Shortly after this, impression hammers 53 are operated to print the amount, and then type bars 13 are lowered to normal position during the last half of the machine cycle.

The following parts are provided to automatically restore slides 246 and pins 47 and 48 to their left or normal position and to restore stops 46, toward the end of a machine cycle, for the next amount indexing operation. Links 254 and 255 (Figure 10) are each pivoted at one of their ends to brackets 252 and 253 and at their opposite ends to arms of a pair of bell cranks 256 and 257. Bell cranks 256 and 257 are pivoted on a stud 258 secured in the machine frame. Each of a pair of slides 259 and 260 is pivoted at 263 and 264 to the opposite arms of bell cranks 256 and 257 and extend toward the rear of the machine, the rear ends of the slides being suitably guided for lateral and longitudinal movement.

Springs 265 and 266 connected to slides 259 and 260 and the machine frame, normally tension the slides counter-clockwise about their pivots causing the left edges of the slides to bear against rollers 267 and 268 on one arm of each of a pair of bell cranks 269 and 270. Bell cranks 269 and 270 are pivoted on a stud 273 secured to the machine frame and each has a shoulder such as 274 lying in the path of movement of a restoring arm 275 secured on the left end of rock shaft 23. The opposite arms of bell cranks 269 and 270 have fingers 276 and 277 that lie behind studs 278 and 279 each of which are fixed in slides 282 and 283 mounted on a stud 280 secured to the machine frame. The rear ends of slides 282 and 283 are pivoted to levers 284 and 285 which in turn are pivoted on a stud 286 secured to the machine frame. Springs 287 connected to levers 284 and 285 normally tension slides 282 and 283 forwardly to a position where clearance is provided between studs 278 and 279 and fingers 276 and 277 when arm 275 is in its normal position engaging shoulders 274.

Upon cycling the machine, as arm 275 swings counter-clockwise away from shoulders 274, bell cranks 269 and 270 swing clockwise and slides 259 and 260 swing leftwardly under the tension of springs 265 and 266 until fingers 276 and 277 strike studs 278 and 279, stopping the slides in a position where their rear ends lie in the path of movement of arm 275. As the cycle continues and arm 275 swings clockwise toward its initial position, the arm strikes the rear ends of the slides and thrusts them forwardly. Forward movement of the slides rocks bell cranks 256 and 257 counter-clockwise pulling links 254 and 255 toward the left and in turn swinging brackets 252 and 253 to the left to restore slides 246 and pins 47 and 48 to normal starting position. Just prior to arm 275 reaching its home position, the arm strikes shoulders 274 rocking bell cranks 269 and 270 counter-clockwise about stud 273, thereby causing rollers 267 and 268 to swing slides 259 and 260 to the right sufficiently to withdraw the rear ends of the slides from in front of arm 275. At this moment, springs 265 and 266 move the slides toward the rear and slides 246 toward the right a slight increment until the escapement mechanism (not shown) associated with each slide 246 engages its slide preparatory to the next amount indexing operation.

Upstanding posts such as 288 (Figures 8 and 11) on the right end of slides 246 have beveled faces 289 that engage the rear ends of any set stops 46 and cam them back to normal position incident to the leftward movement of slides 246 above described. The mechanism so far described is identical with that disclosed in Patent No. 2,194,270.

The right end of each lever 284 and 285 lies in front of a depending arm on each of a pair of bell cranks 292 and 293 pivoted on rod 103. Bell cranks 292 and 293 each have a horizontal arm lying beneath corresponding control cams 294 and 295 secured on shaft 19. Springs 287 hold the arms in cooperative relation with the cams.

Figure 10 shows the parts in the positions that they occupy at the end of a third machine cycle. During the latter half of a third machine cycle, one of four cam surfaces 296 on cam 294 cams lever 284 clockwise on stud 286, pulling slide 282 rearwardly. Rearward movement of slide 282 rocks bell crank 269 counter-clockwise and thus withdraws slide 259 from the path of restoring arm 275 before the arm engages slide 259 so that the "Consumption" amount may be entered on amount keys 1 during this third cycle and retained indexed ready for printing and accumulation on the first cycle of the next billing operation.

During the second half of the first cycle of the next billing operation shaft 19 is rotated a sufficient distance to remove the just effective cam surface 296 from over the horizontal arm of bell crank 292 and to cause one of four cam surfaces 297 on cam 295 to cam the lever 285 clockwise to pull slide 283 rearwardly. Rearward movement of slide 283 swings bell crank 270 counter-clockwise withdrawing slide 260 from the path of arm 275 before the arm restores to home position so that the "Present" amount entered on amount keys 2 before initiating the second cycle is retained in the indexing mechanism during this cycle. The removal of the just effective cam surface 296 from over the horizontal arm of bell crank 292 permits its associated train of parts 284, 282, and 269 to restore so that arm 275 engages slide 259 and clears the "Previous" amount which was entered upon amount keys 1 before initiation of the second machine cycle.

During the second half of the third machine cycle, shaft 19 is rotated a sufficient distance to remove the just effective cam surface 297 from over the horizontal arm of bell crank 293 permitting its associated train of parts to restore to clear the "Present" amount. Simultaneously, the next cam surface 296 of cam 294 becomes effective to retain the "Consumption" amount indexed on amount keys 1, as before described, and so on.

7. Releasing "Present" amount type bars

Mechanism is provided to hold the "Present" amount type bars in their lowermost positions so that the "Present" amount which, as previously stated, is indexed prior to initiating the second cycle, will not print until the third cycle.

This mechanism includes a type bar lock plate 298 (Figures 2 and 8) pivoted on a rod 299 secured in the machine frame. A spring 302 normally tensions plate 298 clockwise about the rod so that its lower edge lies over the rear ends of the "Present" amount type bars 13, preventing their upward movement. A rearwardly projecting arm 303 on the plate carries a pin 304 that rests above a horizontal arm of a bail 305. Bail 305 is pivoted on a rod 306 stationary in the machine frame and has a depending arm 307 at its opposite end that lies in front of a depending arm of a bell crank 308 pivoted on rod 103. A horizontal arm of bell crank 308 is held in cooperative relation with a release cam 309 secured on shaft 19, by tension of spring 302 through the train of connections just described. Figure 8 shows the parts in the position they occupy at the end of a third machine cycle, with plate 298 in effective position. Shaft 19 is rotated a sufficient distance during the first and second cycles combined, to cause one of four cam surfaces 312 on cam 309 to cam bell crank 308 and bail 305 clockwise. Clockwise movement of bail 305 removes plate 298 from effective position. Hence, upon the ensuing (automatically initiated) third cycle, the "Present" amount type bars are allowed to rise and print.

During the second half of the third cycle, shaft 19 is rotated a distance sufficient to remove the just effective cam surface from over the horizontal arm of bell crank 308 as shown in Figure 8 whereupon the parts restore to normal position under tension of spring 302, plate 298 swinging clockwise over the rear ends of the "Present" amount type bars 13 immediately upon their reaching their lowermost positions.

8. Paper supporting and feeding apparatus

The tally roll 8 is supported between two similar arms 313 (Figures 12 and 14) secured within a frame 314 mounted upon a bracket 315 fixed to the machine frame. A shaft 316 (Figure 14) journaled in frame 314 supports platen 7 between the side walls thereof. Tally 8 comprises a continuous strip of paper with a continuous strip of carbon interwound therewith, the free ends of the carbon and paper being brought downwardly under the platen between a suitable pressure roll 317 and the platen and then extending upwardly around in front of the platen and toward the rear. Platen 7 may be rotated manually by a knob 318 secured to the right end of shaft 316 or may be rotated automatically to line space the carbon and paper by the following mechanism.

A toothed ratchet wheel 319 (Figure 14) is secured to shaft 316 between the left end of platen 7 and the left side wall of frame 314. Wheel 319 is engageable by a pawl 322 pivoted at 323 to an arm 324 pivoted on a stud 325 secured in the left side wall of frame 314. A detent arm 326 also pivoted on stud 325 carries a roller 327 that engages the teeth of the wheel under the tension of a spring 328 to hold the platen against improper rotation. A spring 329 connected between pawl 322 and arm 326 normally urges the pawl into engagement with the teeth of the ratchet.

Arm 324 and pawl 322 are oscillated by a pitman 333 pivoted at 334 to the lower end of arm 324. Pitman 333 extends rearwardly and has a pin and slot connection 335 with a lever 336 pivoted at 337 to the machine frame. A spring 338 normally tensions arm 324 and pawl 322 rearwardly and pitman 333 rearwardly upwardly so that a shoulder 339 in the pitman bears against a pin 342 secured in the vertical arm of a bell crank 343 pivoted at 344, in the machine frame. The opposite arm of bell crank 343 is pivoted at 345 to the upper end of a link 346.

Link 346 corresponds to link 652 in Patent No. 2,194,270 and is similarly arranged to be raised and lowered during the first and second half respectively, of each cycle in a manner similar to that disclosed in that patent. Consequently, during each machine cycle, bell crank 343 oscillates first clockwise and then counter-clockwise and, through the train of connections just described, oscillates arm 324 and pawl 322 to line-space platen 7. Pawl 322 has a depending forwardly extending projection 347 having a cam surface 348 that engages an edge 349 of the base of frame 314 during the clockwise oscillation of the pawl. The distance between cam surface 348 and edge 349, when arm 324 is in its rightward position, (Figure 15) is just sufficient to permit rotation of wheel 319 a distance of one tooth before pawl 322 is completely disengaged from the teeth whereby the paper and carbon is advanced a line space.

Since it is desirable to line space the platen only during the first and third cycles of a billing operation, i. e., following the printing of the "Consumption" and "Present" amounts respectively, the following mechanism is provided to prevent line spacing during the second cycle, i. e., following the printing of the "Previous" amount.

The right end of lever 336 is beveled and lies in front of one of four rollers 352 when the parts are in their normal positions, i. e., at the end of a third machine cycle, as shown in Figure 14. Rollers 352 are equi-spaced and mounted on one side of a disc 353 secured on shaft 19. During the latter half of the first machine cycle, following the spacing of platen 7, shaft 19 is rotated a distance sufficient to bring one of the rollers 352 into engagement with lever 336. This rocks the lever counter-clockwise against the tension of spring 338 a distance sufficient to remove shoulder 339 from pin 342 whereupon spring 338 pulls parts 333, 324 and 322 to the right, as shown in Figure 15. Hence, during the second cycle, since shoulder 339 is held disengaged from pin 342, parts 333, 324 and 322 remain idle and no movement is imparted to platen 7. During the second half of this second cycle, however, shaft 19 is rotated a distance sufficient to remove the just effective roller 352 from beneath the right end of lever 336 whereupon pitman 333 rises under tension of spring 338 until its upper edge touches pin 342. During the third cycle, when pin 342 oscillates clockwise beyond shoulder 339, pitman 333 springs upwardly placing the shoulder in front of the pin so that during the subsequent counter-clockwise movement of the pin, platen 7 is line spaced, the parts coming to rest in the positions shown in Figure 14 at the end of the third cycle, and so on.

A chute generally indicated at 9 (Figures 1, 2 and 12) is provided to support the bills. Chute 9 is mounted in front of platen 7 and extends across the front of the machine. It includes a back plate 354 having suitable rearwardly projecting flanges at its base (see Figure 2) for securing the plate on a punch guideblock 355 supported on a bar 356 secured to the machine frame. Two front plates 357 and 358 (left and right) are secured in spaced relation by spacers 359 and 362 to plate 354 by screws 363. A forwardly extending flange on plate 357 is secured by screws 364 on a punch die block 365 secured on bar 356 to rigidly support the assembled chute structure. The upper ends of spacer 359, plates 354, 357 and 358 have flanges 366 that are flared outwardly to facilitate the introduction of a bill into the chute. Front plates 357 and 358 terminate just short of the ends of platen 7 and opposite the ends of an aperture 367 provided in back plate 354 to permit printing by the type bars 13 upon tally 8 and the inserted bill.

The "Consumption" amount is printed through the carbon directly upon the tally during the first machine cycle of a billing operation before inserting a bill. A bill is then taken from the supply magazine 12 (Figure 1) and dropped into the chute. The following mechanism is provided to automatically adjust the bill laterally to proper position before the printing operation takes place. This mechanism includes a lever 368 pivoted at 369 on the right front plate 359 and having a flange 372 entering into openings 373 provided in plates 353 and 354. Lever 368 has a forwardly extending projection 374 which lies directly beneath a plate 375 of a conventional ribbon lift mechanism shown in Figure 13. A weak spring 376 connected between lever 368 and plate 358 tensions projection 374 against plate 375.

The ribbon lift mechanim is identical with that disclosed in Patent No. 2,194,270. It includes parallel upstanding arms such as 377 that are suitably guided for vertical movement in the machine frame. Plate 375 is supported by arms 377 and the ribbon spools are mounted on the plate. This assembly is arranged to be raised and lowered during each cycle of the machine by a cam 379 secured on the actuating shaft 23. During the counter-clockwise oscillation of shaft 23, cam 379 engages a roller 382 mounted on the right arm 377 and raises the assembly against the tension of suitable strong springs (not shown) to place the ribbon in printing alignment with respect to the platen and the type carried by the differentially adjusted type bars 13 prior to the release of hammers 53 (Figure 2).

During the clockwise oscillation of shaft 23, the parts restore to the positions shown in Figure 13 under the tension of the strong springs. This lowers the ribbon below the line of the just printed amount so that the amount is visible. When the ribbon lift mechanism is in this position plate 375 holds lever 368 against counter-clockwise movement by spring 376 and the distance between flange 372 and the inner edge of the left spacer 359 is sufficient to permit free and casual introduction of a bill. Following the descent of the bill into the chute, when plate 375 rises incident to the rise of the ribbon lift mechanism, lever 368 swings counter-clockwise under the tension of spring 376. Counter-clockwise movement of flange 372 pushes the bill leftwardly until its left edge abuts the inner edge of spacer 359 in which position the bill is in proper location for the punching and printing of the "Consumption" and "Previous and Present" amounts respectively.

Following the printing of the "Previous" and "Present" amounts during the second and third machine cycles, the "Consumption" amount is automatically punched and the bill is ejected by mechanisms to be later described. Suffice it now, however, to note that by the mechanism just described the bills are automatically positioned into proper location in chute 9 before the printing and punching operations take place and that by this construction the operator may rapidly remove bills from the magazine and drop them into the chute in a casual manner.

9. Punch mechanism generally

Herein the invention is shown applied to punching bills of the well-known McBee keysort, card type, though it is to be understood that the invention is not limited in its use to punching bills of this character. A McBee card type bill is shown in Figure 33. Such bills, in order to conserve edge space employ a numeric code of four digits: "1," "2," "4" and "7" for each numerical order of a number to be punched. From this code, a digit of any value from 1 to 9 inclusive, can be derived by combination punchings; for example: a "9" is derived from punching "7" and "2," a "5" from "4" and "1," etc. A zero is indicated by non-punching.

In the present application, the lower left edge of the card is allocated to such numeric code punchings which represent the kilowatt hour "Consumption" amounts, there being units, tens and hundreds groups provided from left to right, respectively, and a single digit space for a punching to represent a thousand. To the right of this numeric code field is a field allocated to various classification punchings for indicating the diversified types of bills rendered such as "locked premises," "arrears bill" or "odd-date bill", etc.

A series of punches 14 (Figure 16) corresponding to each punching space of the "Consumption" amount and classification fields are supported side by side along bar 356. The punches are spaced and guided for movement forwardly and rearwardly of the machine in guide block 355 and die block 365 (Figure 19) between which the lower edge of the bill extends when inserted in chute 9.

A series of interponents 383 (Figure 16), there being one interponent for each punch, lie directly behind the punches. The rear ends of these interponents are pivoted in comb slots 384 in a common actuating bar 385 pivoted at 386 in the machine frame. The forward ends of interponents 383 are in vertical alignment with, and normally lie to the rear and just below, the rear ends of the punches. Selection of a punch is accomplished by raising the forward end of its corresponding interponent into horizontal alignment with the punch. The left group of interponents 383 associated with the "Consumption" amount punches are automatically selected under the control of mechanism to be described later, whereas the right group of interponents associated with the "Classification" punches are manually selected under the control of corresponding classification keys 3 and mechanism now to be described.

10. Manual punch selecting and latching mechanism

Referring to Figure 16, the stems of classification keys 3 are each slotted as at 387 to receive lugs of associated bell cranks such as 389 pivoted in the side walls of key section frames such as 392 mounted on the machine base. There is one frame 392 for each row of keys 3, the keys being guided for limited vertical movement in the frames. The opposite arms of bell cranks 389 are pivoted at 393 to the forward ends of corresponding slides 394 the opposite ends of which are provided with three tines. The two outer tines of each slide extend through slots such as 395 in the rear end walls of frames 392 to guide the slides for horizontal movement.

Compression springs such as 396 encircle alternate outer tines of each slide 394 to normally tension the slides forwardly and hold keys 3 elevated as shown in Figure 16. The center tines of the slides are shorter than the outer tines and meet with tongues 397 of corresponding links 398, the tongues entering through slots similar to slots 395 in the end walls of frames 392. Links 398 are formed angularly and have their rear ends pivoted at 399 to depending arms of corresponding bell cranks 402 pivoted on a common rod 403 in comb slots provided in a block 404 secured in bar 356. Each bell crank 402 has a rearwardly projecting arm 405 having a pin and slot connection 406 with its corresponding interponent 383. Springs such as 407 connected to each arm 405 normally tension bell cranks 402 counter-clockwise about rod 403 and hold the forward ends of their associated interponents 383 just below the rear ends of their corresponding punches 14 as shown in Figure 16 (also shown in Figure 27).

The lower end of each key stem has a beveled lug 408 (Figure 18) resting on correspondingly beveled edges of upstanding projections 409 on a pair of latch slides 412. Each projection 409, except one, has a notch 414 to latch its corresponding lug 408 when its key 3 is depressed. Slides 412 are suitably guided for horizontal movement in frames 392 and are connected for joint operation by a rod 416 the left end of which extends through a slot 417 in the left frame 392. Springs such as 415 normally pull the slides toward the rear, pin 416 abutting the rear end of slot 417 to limit the spring action.

Depression of any classification key 3 thrusts its corresponding slide 394 and link 398 rearwardly rocking its corresponding bell crank 402 clockwise a distance sufficient to raise the corresponding interponent 383 into horizontal alignment (Figure 19) with the corresponding classification punch 14 to select the punch for actuation. Concurrently, upon depression of a key, its lug 408 becomes engaged in its corresponding notch 414 thus latching the selected interponent in effective position.

The projection above excepted as having no notch 414 is indicated at 413 and lies beneath the lug 408 on a correction key 418. If the operator should mistakenly depress a classification key and thereby select the wrong punch 14 for a particular operation, such error may be corrected by depressing this correction key to withdraw slides 412 from their effective latching position and release the erroneously depressed key under the tension of its corresponding spring 396 and thus restore its corresponding interponent under the tension of its spring 407.

Following the punching operation which occurs after the completion of a third machine cycle in a manner to be hereafter described, the keys 3 depressed for that operation and their associated interponents are restored automatically by the following parts. Suffice it now to say that actuating bar 385 is reciprocated forwardly and rearwardly about its pivot 386 during a punching operation. A vertical arm 419 secured to the back of bar 385 is connected by pin and slot connection 422 (Figure 17) to the rear end of a slide 423. A yielding connection between arm 419 and slide 423 is provided by a spring 424.

The forward end of slide 423 is slotted and is guided for horizontal movement on a screw 425 secured in the side wall of frame 392. A depending projection 426 formed on slide 423 lies behind the extended end of pin 416.

During the forward stroke of bar 385, arm 419 thrusts slide 423 forwardly taking up the clearance between projection 426 and pin 416 and, following the punching operation by the selected interponents driving their corresponding punches 14 through the bill, projection 426 strikes pin 416 and thrusts slides 412 forwardly. Restoration of the selected keys and their corresponding interponents occurs in identically the same manner as above described in connection with depression of correction key 418. The yielding connection afforded by pin and slot 422 and spring 424 cushions the restoring action of slide 423.

*11. Automatic punch selecting and latching mechanism*

The left group of interponents 383 (Figure 16) associated with the "Consumption" amount punches are automatically selected. This selection occurs during the first cycle of a billing operation under the control of the units, tens, hundreds and thousands order type bars 13 of the left or "Consumption" amount group of bars (Figure 3). Type bars 13 occupying these orders, each have pivoted to their lower ends as at 427 (Figure 20) depending selectors 428, 429, 430 and 431. The lower ends of these selectors are guided in slots such as 434 in an upstanding plate 433 of a selector actuating slide 435. Studs 436 secured in the lower ends of each selector on opposite sides of plate 433 connect the selectors for movement with the slide. Slide 435 is mounted for limited horizontal movement by studs 437 on a base plate 438 suspended from rods 22 (Figure 2).

When the machine is at rest the lower ends of the selectors lie below and in front of the forward ends of corresponding groups of push rods 442, 443, 444 and 445. Rods 442—445 are guided for horizontal movement in brackets 446 secured on base plate 438. There are nine rods in each group arranged one above the other, and spaced vertically to correspond with the positions of type characters "1" to "9" carried by type bars 13. The rear ends of the rods are stepped progressively further to the rear in accordance with their order groups, the units rods being the longest and the thousands rods being the shortest. Each group of rods lies immediately in front of the right ends of corresponding banks of levers 447, 448, 449 and 450.

The levers in each bank are arranged vertically one above the other and are pivoted intermediate their ends on studs 453, 454, 455 and 456. The left ends of each bank of levers lie immediately behind corresponding groups of code selector slides 457, suitably guided for horizontal movement on base 438. Slides 457 are divided into four groups corresponding to the four numeric code orders of the "Consumption" field of the bills. That is, there are four slides 457 corresponding to the digits "1," "2," "4" and "7" for the units order, and likewise four slides 457 for the tens and hundreds orders and a single slide for the single punch space on the bill for the thousands order. The rear ends of the groups are stepped, similar to rods 442—445, progressively further to the rear in accordance with their order group, the units slides being the longest and the thousands slide being the shortest. The forward ends of slides 457 are each pivoted to a depending arm of a series of four-arm bell cranks such as 458. Bell cranks 458 are pivoted at 459 in a lower set of comb slots provided in a block 462 supported on base 438.

A series of dual arm latches such as 463, there being one latch for each bell crank 458, are each pivoted at 464 in a corresponding upper set of comb slots in block 462. The lower ends of a series of vertical links such as 465 are each pivoted at 466 to forwardly extending arms of bell cranks 458 and pivoted at their upper ends at 467 (Figure 16) to their corresponding interponents 383 of the left or "Consumption" amount group. Bell cranks 458 (Figure 20) have upstanding stop arms carrying studs 468. Springs 468' connected between horizontal arms of latches 463 and rearwardly extending arms of bell cranks 458, normally, coactively tension the stop arms against the back of block 462 and depending arms of latches 463 against studs 468. In this position the associated interponents 383 are held out of horizontal alignment with and just below the rear ends of the corresponding "Consumption"

amount punches 14, as shown in Figure 16, and the code selector slides are held in their rearmost positions as shown in Figure 20.

The selector actuating slide 435 is controlled by mechanism including a lever 469 pivoted at 472 at its left end to base 438 and connected at its right end by a flange and slot connection 473 with the lower end of a vertically disposed lever 474 pivoted at 475 in a bracket 476 secured to base 438. Lever 469 is connected intermediate its end to slide 435 by a pin and slot connection 477. Springs 478 and 479 connected to slide 435 and lever 474 respectively, normally tension the slide toward the rear. A latch 482 pivoted at 483, however, has a shoulder 484 engaging a pin 485 in the upper end of lever 474 to restrain slide 435 and the associated selectors 428—431 against such rearward movement. A spring 486 connected to latch 482 normally tensions the latch into effective position as shown in Figure 20.

During the first half of the first cycle of a billing operation as the "Consumption" amount type bars 13 rise to print the "Consumption" amount, selectors 428—431 rise with the type bars and are differentially stopped therewith so that their lower ends lie opposite the push rods 442—445 corresponding to the digits "1" to "9" in the respective orders of the number to be printed. Concurrently, as roller 25 of actuating arm 24 swings upwardly in the arc defined by the dot-and-dash line in Figure 20, it strikes a depending projection 487 on latch 482 and raises the latch to remove shoulder 484 from in front of pin 485.

Simultaneously with the removal of shoulder 484, roller 25 engages a surface 488 on lever 474 which surface is formed concentric with the arcuate path of the roller so that even though latch 482 is raised from effective position, springs 478 and 479 are still held from pulling slide 435 rearwardly. Just before hammers 53 (Figure 2) fire, however, roller 25 rises above surface 488 whereupon springs 478 and 479 pull slide 435 rearwardly a distance sufficient to cause the lower ends of selectors 428—431 to strike their corresponding push rods 442—445. Rearward movement of the selected rods 442—445 rocks their corresponding levers 447—450 counterclockwise. The rocked levers in turn thrust their corresponding slides 457 forwardly, rocking their corresponding bell cranks 458 clockwise and in turn thrusting the associated links 465 upwardly to raise the corresponding interponents 383 into horizontal alignment with the corresponding punches 14 and thus select the "Consumption" amount punches.

The forward thrust movement upon bell cranks 458 is sufficient to cause studs 468 in the stop arms of the bell cranks to engage shoulders 489 in depending arms of latches 463 under the tension of springs 463' to hold the parts 458, 465 and 383 in selected position as shown in Figure 19.

Referring to Figure 21, it is seen that the rear ends of slides 457 in the units, tens and hundreds order groups are notched, the notches in each slide being correspondingly irregular. The notches in each group conform to the "1," "2," "4," "7" numeric code of the bill (Figure 33). Hence, counter-clockwise movement of a selected lever 447—450 representing a digit value of either "3," "5," "6," "8" or "9" will thrust two slides 457 of any group forward to effect the required code punchings in accordance with the value of the digit of the "Consumption" amount in that particular order.

In the event that no digit is used in a particular order or that a zero is to be printed, no movement is imparted to the punch selecting train because, as will be observed in Figure 2, the lower ends of selectors 428—431 lie a sufficient distance below the lowermost rods of each group 442—445 so that when the associated type bars 13 rise only to zero position, the lower ends of their selectors still lie below the lowermost rod of that group.

Following the selection and latching of interponents 383, as above described, and at the beginning of the second half of the cycle, roller 25 (Figure 20) swings clockwise engaging a cam surface 492 on lever 474 and camming the lever clockwise to restore slide 435 and the associated selectors 428—431 before type bars 13 and the selectors start their descent to normal position. Concurrently, latch 482 reengages pin 485 to hold the slide and selectors latched for punch selecting on the next first cycle of a billing operation.

Since latch 482 is released during each machine cycle; and since the "Consumption" amount punches 14 are selected only during the "Consumption" amount printing cycle, i. e., the first cycle of a billing operation, the following parts are provided to lock the punch selecting mechanism against operation during the second and third cycles of a billing operation. A lock lever 493 pivoted at 494 in the machine frame has a shoulder 495 at its forward end arranged to engage pin 485. The rear end of lever 493 has a pin and slot connection 496 with a lever 497 pivoted on rod 103. The rear end of lever 497 lies beneath a punch selector lock cam 498 secured on cam shaft 19. A spring 501 connected to lever 497 tensions the rear end of the lever into operative relation with cam 498 and shoulders 495 toward effective position with respect to pin 485. Cam 498 has four equi-spaced cam surfaces 502 about its periphery. At the completion of a billing operation, i. e., the end of a third machine cycle, one of the cam surfaces 502 engages the rear end of lever 497 as shown in Figure 20 and rocks lever 497 clockwise about rod 103 and lever 493 counterclockwise about pivot 494 against the tension of spring 501. In this position, shoulder 495 is held below the horizontal plane of pin 485. Consequently, during the first machine cycle, lever 493 is ineffective to lock lever 474 and slide 435 against punch selecting actuation. However, during the second half of a first cycle, rotation of shaft 19 by pawl 95 in the usual manner, removes the just effective cam surface 502 from over the rear end of lever 497 permitting shoulder 495 to engage pin 485 under the tension of spring 501 to lock lever 474 and slide 435 against movement. The parts remain locked during the second and third machine cycles so that even though latch 482 is removed from in front of pin 485 during these cycles, no selection occurs. During the second half of an ensuing third machine cycle, the next cam surface 502 engages the rear end of lever 497 to disable lock lever 493 during the ensuing first machine cycle, and so on.

The following mechanism is provided to release latches 463 and thus restore interponents 383 during the first half of a first machine cycle just prior to selection of punches for the next billing operation.

A square rod 503 (Figure 20) extends across base 438 and is journaled at its opposite ends in brackets 504 secured on the base (see also Figure 22). A plate 505, secured on the underside of the left end of rod 503, lies immediately beneath the rear ends of the horizontal arms of the dual arm latches 463. A depending plate 506 secured to the back of the right end of rod 503 is connected by a notch and slot connection 507 to one end of a link 508. The opposite end of link 508 is pivoted at 509 to a lever 512 pivoted on rod 103. Lever 512 lies beneath a punch selector restoring cam 513 secured on shaft 19. A catch 515 is pivoted at 514 to a forwardly extending projection formed on plate 506. A shoulder 516 on the catch is arranged to be engaged with and disengaged from a pin 517 secured in a lever 518. Lever 518 is pivoted at 519 to bracket 476. A spring 522 holds the upper end of the lever against a roller 523 mounted on tie rod 32. A link 524, pivoted at 525 to arm 26, is connected by a pin and slot connection 526 to catch 515, for limited upward movement with the arm. A spring 527 connected to catch 515 normally tensions the catch downwardly and holds lever 512 in operative relation with cam 513.

During the latter half of a third machine cycle, one of four equi-spaced cam surfaces 528 on cam 513 depresses lever 512 and thrusts link 508 toward the left from the position shown in Figure 25, rocking plate 506 clockwise, a distance sufficient to place shoulder 516 in front of pin 517, as shown in Figure 22. During the first cycle of the next billing operation, as roller 25 raises arms 26 toward the position shown in Figure 23, roller 523 engages a cam surface 529 on lever 518 and cams the lever counterclockwise against the tension of spring 522. Counterclockwise movement of lever 518 pulls catch 515 to the left, rocking shaft 503 and plate 505 clockwise a distance sufficient to remove shoulders 489 (Figure 20) from engagement with studs 468, whereupon links 465 and their associated interponents 383 are automatically restored to normal position (shown in Figure 16) under the tension of springs 469. The release of latches 463, takes place just before roller 25 raises latch 482 (Figure 20) for selection of "Consumption" punches 14 for the ensuing billing operation. As roller 25 continues its counterclockwise movement from the position shown in Figure 23 to the position shown in Figure 24, roller 523 rides idly along a dwell surface 532 on lever 518 and the further rising movement of arm 26 takes up the lost motion in pin and slot connection 526 and pulls catch 515 upwardly removing shoulder 516 from in front of pin 517. Immediately upon the removal of shoulder 516, spring 527 pulls catch 515 toward the right, whereupon latches 463 are permitted to restore under the tension of springs 469 and lever 512 is restored to operative relation with cam 513.

During the second half of the first machine cycle, the parts restore to home position as shown in Figure 25 and cam 513 is rotated a distance sufficient to remove the just effective cam surface 528 from over lever 512 whereupon spring 527 pulls catch 515 further to the right so that, as the parts come to rest, the lower edge of catch 515, just in front of shoulder 516, rests on pin 517 holding shoulder 516 from engagement therewith. During the second and third machine cycles, no movement is imparted to latch restoring parts 503, 505, and 506 because shoulder 516 is not thrust in front of pin 517 until the latter half of the third cycle when the next cam surface 528 depresses lever 512 to again thrust the catch leftwardly from the position shown in Figure 25 to the position shown in Figure 22.

12. Punch actuating mechanism

The selected punches are actuated to punch the bill upon the completion of the third cycle of a billing operation. The actuating train includes a gear 533 (Figure 26) secured on the driving element of clutch 56 (Figure 4). A gear 534 (Figure 26) suitably mounted above and meshing with gear 533 has a link 535 connecting gear 534 to the lower end of a lever 536 pivoted at 537 to the machine frame. The upper end of lever 536 is pivoted to the forward end of a shuttle 538. A projection 539 on the rear end of the shuttle extends upwardly through an opening 542 in a plate 543 supported on the machine frame. A stud 544 and a roller 545 secured on projection 539 respectively below and above plate 543 guide the shuttle for horizontal movement. By the train of parts just described, shuttle 538 is reciprocated forwardly and rearwardly of the machine continuously while the motor circuit remains closed.

A pitman 546 is pivoted at its forward end on a stud 547 within a slot 541 (see also Figures 16, 19 and 27) in a bracket 548 secured to actuating bar 385. Pitman 546 has a shoulder 549 arranged to be engaged with and disengaged from projection 539 under the control of certain mechanism to be hereafter described. The rear end of pitman 546 has a slot 552 embracing a pin 553 secured in projection 539 to guide it in vertical alignment with the projection. A weak leaf spring 554 secured at one end to the upper face of pitman 546 has its free end bearing against the top of slot 541 to normally tension the pitman downwardly into engagement with projection 539 as shown in Figure 26. A spring 555 connected to stud 547 normally tensions bar 385 and its associated interponents 383 rearwardly.

When the pitman is lowered, projection 539 engages shoulder 549 and, during the forward stroke of shuttle 538, thrusts actuating bar 385 forwardly against the tension of spring 555 so that the selected interponents drive their corresponding punches forward through the bill into the openings of the punch die block 365 to effect the punching. During the return stroke of shuttle 538, bar 385 and interponents 383 return therewith under the tension of spring 555 and continue in idle reciprocal movement until pitman 546 is disengaged from shuttle 538 at the beginning of the next first machine cycle in a manner to be later explained. Each punch 14 has a depending pin such as 556 that extends downwardly into a groove 557 in bar 356 to limit the punches in their forward and rearward movements.

The actuated punches 14 are restored to their rearmost or normal position during the latter half of the next first machine cycle by mechanism now to be described. A bar 559 pivoted on a rod 562 extends transversely above punches 14 and has its lower edge lying within notches 558 in upper faces of the punches. A link 563 connects the right end of the bar with a lever 564 pivoted at 565 in the machine frame. The lower end of lever 564 normally lies just out of the path of rollers 352 on disc 353. During a punching operation, however, the rear ends of slots 558 engage bar 559, rocking it forwardly whereupon link 563 rocks the lower end of lever 564 into the path traversed by rollers 352 as shown in Figure 26. A spring tensioned detent 566 pivoted at 567 engages a pin 568 secured in the left end of bar 559 and holds the parts in these positions. During the second half of first machine cycle, rotation of shaft 19 advances one of the rollers 352 a sufficient distance to engage the lower end of lever 564 and rocks it clockwise as viewed in Figure 27. Clockwise movement of the lever pulls link 563 and the lower edge of bar 559 rearwardly to restore any actuated punches 14 to their rear or normal positions as shown in Figure 27, ready for the next punching operation. Coincidentally, detent 566 becomes effective to hold the lower end of lever 564 just out of the path of rollers 352 and holds the parts in restored position as shown in Figures 19 and 27 until the next punching operation.

13. Automatic proof control for punch actuating mechanism

Pitman 546 is raised and lowered out of and into the path of shuttle 538 under the control of disc 88 and the crossfooter. It is permitted to be engaged by the shuttle if, and only if, the total of the "Consumption" and "Previous" amounts added on the crossfooter equal the "Present" amount subtracted from the crossfooter so that the wheels are restored to zero, proving the transaction to be correct.

This proving mechanism includes a sensing feeler 569 (Figure 26) formed on a plate 572 pivoted on a rod 573. Feeler 569 lies above and across wheels 17 and is normally held out of engagement therewith as shown in Figure 27. Plate 572 is connected by a pin and slot connection 574 to a forwardly extending arm 575 of a three-arm lever generally indicated at 576. Lever 576 comprises a shaft 577 suitably journaled in the machine frame and having arm 575 fixed to its right end, another forwardly extending arm 578 fixed to its left end and a rearwardly extending arm 579 fixed on the shaft between arms 575 and 578. The left arm 578 has a beveled lug 582 cooperating with a correspondingly beveled notch 583 in disc 88. The rear end of center arm 579 is connected by a pin and slot connection 584 to the lower end of a link 585. The upper end of link 585 is pivoted at 586 to one arm of a bail 587 pivoted on a rod 588. A laterally extending finger 589 formed on the opposite arm of bail 587 lies immediately beneath pitman 546. A spring 592 superior in strength to spring 554 is connected between bail 587 and arm 579 to provide a yielding connection between the bail and lever 576.

Each wheel 17 has a pair of oppositely disposed notches 593 (Figure 28) between certain identical teeth in the wheels, which notches lie in parallel uniform alignment when all of the wheels are in their zero positions. Wheels 17 are at zero position when their transfer lugs 590 lie in the position shown in Figure 28 with respect to their corresponding transfer dogs 591 as more fully disclosed in Patent No. 2,194,270.

At the end of a third machine cycle, the crossfooter wheels remain engaged with subtraction racks 42 following the subtraction of the "Present" amount. Assuming the billing entries are correct and have been correctly indexed by the operator, the above described parts lie in the positions shown in Figure 26, i. e., feeler 569 lies in the upper set of aligned notches 593, lug 582 lies in notch 583 and pitman 546 is lowered into engagement with shuttle 538.

At the beginning of the next first machine cycle, before the crossfooter is withdrawn from engagement with subtraction racks 42, rotation of disc 88 causes the bevel of notch 583 to cam arm 578 upwardly. Upward movement of arm 578 rocks lever 576 counter-clockwise causing arm 579 to rock bail 587 and finger 589 counter-clockwise to raise pitman 546 out of engagement with shuttle 538. A screw 594 (Figure 27) secured in plate 543 beneath the body portion of bail 587 provides an adjustable stop for limiting the rocking movement of the bail and the upward movement of pitman 546. The pin and slot connection 584 and the yielding connection of spring 592, however, permits arm 579 to descend its full extent of downward movement in the slot of the pin and slot connection, stretching spring 592, as shown in Figure 27. Concurrently with the raising of pitman 546, arm 575 lifts finger 569 upwardly out of engagement with crossfooter wheels 17.

During the latter half of this first machine cycle, wheels 17 engage adding racks 44 as previously described and this bodily shifting of the crossfooter brings shaft 114 thereof directly beneath a depending projection 595 secured on the bottom of plate 572 so that at the completion of the first machine cycle, feeler 569, lug 582 and pitman 546 are held in their raised positions by projection 595 resting on shaft 114 as shown in Figure 27. During the second machine cycle the crossfooter is withdrawn from engagement with racks 44 to an intermediate position during the first half of the cycle and then reengaged therewith during the latter half of the cycle. During this movement of the crossfooter, projection 595 continues to hold the parts in their elevated positions because removal of shaft 114 to its intermediate position between the two sets of racks 42 and 44 is insufficient to withdraw it from beneath projection 595. At the beginning of the second half of a third machine cycle, however, shaft 114 is withdrawn from beneath projection 595 when the crossfooter wheels are brought into engagement with subtraction racks 42 whereupon lug 582 rides on the periphery of disc 88 to maintain feeler 569 and pitman 546 in their elevated positions.

At the very end of a third machine cycle, following the subtraction of the "Present" amount, lug 582 enters notch 583 under the action of gravity on plate 572 connected with arm 575. At this time one set of the notches 593 is in vertical alignment with feeler 569 as shown in Figure 28 and concurrently, the feeler descends to sense the horizontal alignment of these notches. If feeler 569 finds the notches in parallel uniform alignment it descends therein. This descending movement is sufficient to take up the lost motion of pin and slot connection 584 and thrust link 585 upwardly to rock bail 587 and lower finger 589 a distance sufficient to lower pitman 546 into the path of shuttle 538 as shown in Figure 26, for the punching operation as described in the preceding topic.

If, however, one or more notches 593 are not in parallel uniform alignment, i. e., if the crossfooter wheels have not been cleared to zero, feeler 569 is withheld from descending a distance sufficient to thrust link 585 upwardly. Consequently pitman 546 is withheld from engaging shuttle 538 and no punching operation occurs, thus signalling the operator of an error. Errors are corrected by clearing the crossfooter in a manner to be later explained.

14. Automatic bill ejecting mechanism

Mechanism is provided for automatically ejecting an inserted bill from within chute 9, following the punching operation.

The bill ejecting mechanism (Figure 29) is located directly to the rear of chute 9 and to the left of the platen supporting frame 314 (Figure 12). Auxiliary rollers 596 mounted on brackets 597 at opposite ends of front plate 357 extend into openings 598 provided therein. Corresponding feed rolls 599 (Figures 29 and 30) secured to a shaft 602 and extending through openings 603 in rear plate 354 are arranged to be swung into and out of feeding relation with rollers 596 to frictionally engage the bill between the rollers.

Shaft 602 is journaled at its opposite ends in depending arms 604 pivoted at their upper ends on a tie rod 605 extending between side walls 606 and 607 secured on bar 356. The lower ends of arm 604 extend downwardly in front of and are tensioned against bar 559 by springs 608 connected to arms 604. When bar 559 is in its rearmost position as shown in Figure 29, arms 604, shaft 602 and rollers 599 are swung rearwardly away from rollers 596 to provide clearance in chute 9 for the insertion of a bill. A slot 609 in the right side wall 607 permits this movement of shaft 602.

A ratchet toothed pinion 612 is secured on shaft 602 between the right arm 604 and side wall 607. An arcuate rack 613 pivoted at 614 to the upper end of a lever 615 has corresponding ratchet teeth engaging pinion 612 under the tension of a spring 616 connected between the rack and the lever. Lever 615 is pivoted on a screw 617 secured in side wall 607 and has a pin 618 secured in its lower end lying below the forward end of a coupler 619. The rear end of coupler 619 is pivoted at 622 to a slide 623 mounted on plate 543 by screws 624. The rear end of slide 623 is connected to a stud 625 secured in projection 539 of shuttle 538. By this connection slide 623 and coupler 619 reciprocate forwardly and rearwardly with shuttle 538.

The forward end of coupler 619 has a pair of oppositely disposed shoulders 626 and 627, one above the other, the upper shoulder being the right end of slot 628 in the coupler, said slot having an opening between the shoulders. An upstanding forwardly extending finger 629 formed on the forward end of coupler 619 rests on a lug 632 formed on one arm of a bell crank 633 pivoted on rod 562. The opposite arm of bell crank 633 extends downwardly in front of bar 559 and is tensioned against the bar by a spring 634. When bar 559 is in its rearmost position bell crank 633 holds coupler 619 elevated so that shoulder 626 is in the horizontal plane of pin 618 as shown in Figures 29 and 32.

Forward thrust of bar 559 incident to a punching operation, rocks arms 604 forwardly thrusting rollers 599 into feeding relation with rollers 596 so that the inserted bill is firmly grasped between the rollers. Concurrently bar 559 rocks bell crank 633 counter-clockwise and as shoulder 627 comes into vertical alignment with pin 618 incident to the forward thrust of slide 623, coupler 619 drops so that shoulder 627 lies in front of the pin as shown in Figure 31. During the ensuing rearward stroke of slide 623, shoulder 627 pulls lever 615 clockwise to the position shown in Figure 30 whereupon rack 613 rotates pinion 612 an amount sufficient to thrust the bill upwardly out of the chute as shown in this figure. The parts remain in this position until bar 559 is retracted during the next first machine cycle, slot 628 permitting coupler 619 to reciprocate idly on pin 618.

During the second half of the next first machine cycle, when bar 559 rocks clockwise to restore punches 14, as previously described, rollers 599 are withdrawn from feeding relation with rollers 596 to permit insertion of the next bill and bell crank 633 rocks clockwise under tension of spring 634 to tension coupler 619 upwardly. As soon as the opening in slot 628 reaches pin 618 incident to rearward movement of the coupler, shoulder 626 springs upwardly to a position behind the pin as shown in Figure 32.

During the next forward stroke of the coupler, it thrusts lever 615 counter-clockwise whereupon rack 613 ratchets idly over pinion 609 back to its normal position as shown in Figure 29, ready for the next bill ejecting operation. The parts remain in this position with coupler 619 held suspended by finger 629 resting on lug 632, the finger riding idly to and fro thereon until the next punching operation occurs, when bar 559 is again thrust forward to lower shoulder 627 in front of pin 618 for the next ejecting operation.

It will be noted that, when a non-punching occurs because of an error in the billing, as previously described, shoulder 627 is not permitted to drop in front of pin 618; consequently the current bill is not ejected. Non-ejection of a bill augments the signal of non-punching to notify the operator of the error.

15. Normal billing operation

A normal billing operation involving "Consumption," "Previous reading" and "Present reading" amounts of "75," "125" and "200," respectively will now be described. Referring to Figure 33, it will be remembered that tally 8 lies directly behind the right end of the bill with a carbon strip between the bill and the tally, the tally being shown offset in this figure for clearness.

The "Consumption" amount "75" is indexed on the left set of amount keys 1 and motor bar 6 depressed to initiate the first machine cycle.

During the first machine cycle:

(a) The "75" is printed directly through the carbon on tally 8 as shown on line 635.

(b) The "75" is added on the crossfooter and left section of "A" register.

(c) Punch interponents 383 representing "75" are selected and latched.

(d) A bill count of "1" is added on the right section of the "A" register.

(e) Platen 7 is line-spaced to advance tally 8 to line 636.

(f) Left keyboard 1 is cleared.

The bill is then inserted in chute 9, the "Previous" amount "125" indexed on the left set of amount keys 1 and the "Present" amount "200" indexed on the right set of amount keys 2. Classification key 3, representing "Special" is depressed to select and latch interponent 383 associated with the corresponding "Special" punch of the "Classification" group. The motor bar 6 is again depressed to initiate the second machine cycle.

During the second cycle:

(a) The "125" prints in the "Previous" columns of the bill and, through the carbon on line 636 of tally 8.

(b) The "125" is added on the crossfooter and the left section of the "B" register.

(c) The "125" is cleared from amount keys 1.

(d) The "Present" amount "200" is retained indexed but is non-printed and non-accumulated by virtue of type bar lock plate 298.

(e) No line space movement is imparted to tally 8.

(f) Motor repeat cam 94 automatically initiates the third machine cycle.

During the third machine cycle:

(a) The "200" is printed in the "Present" amount column of the bill and through the carbon on line 636 of tally 8.

(b) The "200" is subtracted from the crossfooter and added in the right section of the "B" register.

(c) Platen 7 line space advances tally 8.

(d) The "200" is cleared from the right set of amount keys 2.

Following the third machine cycle, since the subtraction of the "Present" amount "200" from the added "Consumption" and "Previous" amounts "75" and "125" clears the crossfooter wheels to zero proving the transaction, feeler 569 descends into notches 593 to permit the selected punches to punch "Spec." in the "Classification" field and code punches "7," "4 and 1" representing the "75" in the "Consumption" field of the bill as shown in Figure 33.

It will be noted that the clearance of the "Previous" amount from the left set of amount keys 1 at the end of the second machine cycle permits the indexing of the "Consumption" amount for the next billing transaction during the third machine cycle of the current billing operation, thus expediting the procedure.

Following the punching operation, the bill is ejected as described in the preceding section.

16. Dual meter reading bills

It is sometimes necessary to print two lines of "Previous" and "Present" amounts representative of two sets of readings for a single "Consumption" amount as shown in Figure 34. This arises either where there has been a change of meters between the usual meter reading dates or where a meter exceeds its capacity between these dates.

Mechanism for enabling the dual line printing of the two sets of readings is shown in Figure 36. It includes a "Dual Line" key 637 pivoted on a stud 638 secured on the machine frame. A rearwardly extending projection 639 on the key lies immediately beneath a plate 642 loosely pivoted on screws 643 secured in the bottom of bar 356. A pair of pins 644 loosely secured on plate 642 extend upwardly into openings provided in bar 356. Springs 645 encircling the pins between the bottom of bar 356 and the top of plate 642 normally urge the plate and pins downwardly against projection 639, projection 639 being held against movement by a lug 646 on the lower end of a latch 647 loosely pivoted under spring tension at 648 to key 637. A spring 649 normally tensions key 637 upwardly so that lug 646 stops against a flange 652 formed on a catch 653 secured on the top plate 654 of the section which houses stops 46 (see Figure 2). In this position the upper ends of pins 644 are flush with the upper surface of bar 356.

When a dual meter reading operation is to be performed, however, key 637 is depressed against the tension of spring 649 causing lug 646 to engage a shoulder 655 on catch 653. This distance of movement of key 637 is sufficient to rock plate 642 and thrust pins 644 upwardly into openings 656 (see also Figure 29) provided in blocks 355 and 365 so that their upper ends intercept the complete downward movement of a bill inserted within chute 9. Hence, when this key is depressed, before the printing of the first set of "Previous" and "Present" amounts, the bill is held elevated so that the printing is effected on a lower line thereof.

Following printing of the first set of amounts, the parts restore to their normal position as shown in Figure 36 so that the bill may be reinserted its full extent of downward movement into chute 9 to bring the normal "Previous" and "Present" amount printing line into alignment with the type characters. Restoration of key 637 and pins 664 is effected by an indexing indicator slide 657 guided for lateral movement on plate 654 by screws 658 and 659 passing through slots in the plate and the slide respectively. Screw 658 is secured to the upper end of post 288 (see also Figure 8) associated with the right set of amount keys 2, thus connecting the slide for movement with the indexing mechanism.

It will be remembered that the "Present" amount indexed in the right set of amount keys is retained indexed until the end of a third machine cycle under the control of the mechanism described in topic 6 and it will also be remembered that incident to the clearing of this right stop section, post 288 and its associated slide 246 are thrust leftwardly a distance beyond that necessary to clear the stops and then move toward the right a slight increment until escapement mechanism (not shown) associated with slide 246 engages the slide preparatory to the next amount indexing operation. When key 637 is depressed, a depending projection 662 is lowered into the plane of a laterally extending projection 663 formed on slide 657. During the excess increment of leftward movement imparted to slide 657, projection 663 strikes projection 662 releasing latch 647 from shoulder 655 and permits the parts to restore under tension of springs 649 and 645 to the positions shown in Figure 36.

Since the two sets of amounts represent but a single bill, it is necessary that the bill counting mechanism be disabled during the printing and accumulation of one set of the amounts in order to prevent a double count. A non-count key 664 (Figures 35 and 36) pivoted at 665 to the machine frame is provided for this purpose. A rearwardly extending slide 666 pivoted at 667 to a depending arm of key 664 is suitably guided for horizontal movement adjacent cam 243 in a slot 668 in the machine frame.

A spring 669 connected between key 664 and a pin 672, normally tensions an upward extension on the key against the pin and pulls slide 666 toward the left as viewed in Figure 35. In this position, the rear end of the slide lies just below and out of the path of flange 242 on lever 237. Depression of key 664 thrusts slide 666 to the right as shown in dotted lines in Figure 35, into the path of flange 242. A latch 673 similar to latch 647 and similarly pivoted under spring tension at 674 to key 664, has a lug 675 that engages the lower edge of a catch 676 secured on the machine frame to hold the parts in this position. Key 664 is depressed, prior to initiation of a first machine cycle for printing and accumulating the first set of amounts involved in a dual meter reading operation. Consequently, during the second half of this first machine cycle, the rear end of slide 666 prevents descent of flange 242 into notch 244 of cam 243 and thereby disables the bill count mechanism during this cycle.

A laterally extending rod 677 secured in latch 673 has a forwardly extending arm 678 lying to the left of an upstanding pin 679 secured on slide 657. At the end of the third machine cycle, incident to the excess increment of leftward movement of slide 657 (the mechanism for retaining indexed items indexed being ineffective at this time) pin 679 strikes arm 678 pulling latch 673 toward the left to release key 664, whereupon slide 666 is restored to normal position shown in full lines in Figure 35 ready to effect a bill count upon the next first machine cycle.

Referring to Figure 34, a dual reading operation for a change of meters will now be described. With no "Consumption" amount indexed and with non-count key 664 depressed, motor bar 6 is depressed to initiate a blank first machine cycle during which no count is effected, tally 8 is advanced to line 682. Then dual line key 673 is depressed to raise pins 645 for supporting the bill one line above the normal line of printing and the bill is inserted within chute 9. The first set of "Previous" and "Present" readings "125" and "250" are indexed on the left and right sets of amount keys 1 and 2 respectively, and motor bar 6 again depressed to initiate the second machine cycle.

During the second and the ensuing automatic third machine cycle, these amounts are printed on the lower line of the bill and accumulated in the same manner as in normal billing operations, key 637 being restored at the end of the third machine cycle. The bill is not ejected at the end of this cycle because the crossfooter is not cleared. However, the operator removes the bill from chute 9. The "Consumption" amount "250" representing the combined "Consumption" of the first set of amounts just described and the second set of amounts, description of which is to follow, is then indexed on the left set of amount keys 1 and motor bar 6 depressed to initiate a first machine cycle. During this cycle "250" is printed on line 683 of tally 8 and accumulated, the same as in a normal billing operation, and tally 8 is advanced to line 684.

The bill is replaced in chute 9, the upper line of the bill now being in printing position, the second set of "Previous" and "Present" amounts "75" and "200" are indexed on amount keys 1 and 2 respectively and motor bar 6 depressed to initiate a second machine cycle. During the second and third cycles, the amounts are printed and accumulated the same as in normal billing operations. At the end of the third machine cycle, the crossfooter being cleared by the addition and subtraction of all the above mentioned amounts, the "Consumption" "250" is punched in its field of the bill as shown in Figure 34.

The sequence of operations in connection with a dual meter reading occasioned by a meter exceeding its capacity is performed in identically the same manner as the operations above described. Two sets of computations of the meter reader are shown on tally 8 of Figure 34 as first set: "9918" and "9999" (capacity) on line 685 and, second set: "0" and "26" on line 687. The "Consumption" is indicated as: "107" on line 686, this amount representing the combined total of the differences between the two foregoing sets of amounts plus "1" which is added by the reader for the turnover from "9999" to "0."

It will be noted that a signal "T" is printed opposite the "Consumption" amount "106" to indicate that the transaction involved a meter turnover. This signal is caused to print by depressing an appropriate signal key 688 (Figure 1) concurrently with the indexing of the "Consumption" amount "107" and is printed by conventional signal printing mechanism such as that disclosed in Patent No. 2,194,270.

17. *Duplicate bills*

Duplicates of a bill may be printed and non-counted and the amounts involved non-accumulated in the registers. A "Duplicate Bill" key 689 (Figure 7) and its appurtenant train of parts is identical with the "Non-Add" key 453 and associated mechanism disclosed in Patent No. 2,194,270. Suffice it to say here that depression of key 689 pulls a corresponding slide 690 forward to cause a bail 691 pivoted on a shaft 692, to rock counter-clockwise and place a pin 693 in the left end of the bail in front of pin 211 secured on lever 209. When pin 693 is in this position, shoulder 204 of pawl 200 is not permitted to engage pin 211 at the beginning of the second half of a cycle and consequently the register selected for that cycle is not engaged with adding racks 37. Key 689 and the associated parts are held in effective position by a conventional latch slide 694 that is automatically released at the end of a cycle as disclosed in the aforementioned patent, to permit the parts to restore.

Since a duplicate billing operation requires the non-add mechanism to remain effective throughout the three cycles, an additional latch 695 (Figure 20) is provided to retain slide 690 in its forward position until the end of a third cycle. Latch 695 is pivoted on rod 186 and has one of its arms formed with a depending projection 696 and its opposite arm connected by a pin-and-slot connection 697 to a link 698. The upper end of the link is pivoted at 699 to the pin of pin-and-slot connection 496. A spring 702 normally tensions latch 695 clockwise about rod 186 and, at the end of a third machine cycle, when one of the cam surfaces 502 of cam 498 engages lever 497 to rock it counter-clockwise as previously described, the lost motion of pin and slot connection 697 is taken up and projection 696 is withheld from descent against tension of spring 702 as shown in Figure 20.

As shown in Figure 33 on lines 703 and 704 of tally 8 the original bill of a duplicate series is printed and accumulated in the same manner as a normal bill. Following this, the duplicates are printed as shown on lines 705 and 706 in exactly the same manner as the originals except that before depressing motor bar 6 to initiate a first machine cycle for printing the "Consumption" amount, key 689 is depressed so that this amount will be non-added on the "A" register, the non-adding parts 690, 691, 693 being held in their effective position during this cycle by latch slide 694, (Figure 7). The rear end of slide 690 now lies in front of projection 696. During the second half of this first machine cycle, removal of the just effective cam surface 502 (Figure 20) from over lever 497 lowers link 698 whereupon projection 696 descends in back of the rear end of slide 690 under the tension of spring 702. This occurs before the latch slide 694 (Figure 7) releases key 689. Consequently slide 690 and the associated non-add parts are held in effective position by latch 695 during the second and third machine cycles so that the "Previous" and "Present" amounts are non-added following their printing upon the duplicate bill.

At the end of a third machine cycle, the next cam surface 502 rocks lever 497 clockwise to raise link 698 and pull latch 695 counter-clockwise to lift projection 696 from behind the rear end of non-add slide 690, whereupon the slide and its associated parts restore to normal position.

Duplicate bills are non-counted because, as above stated, the adding registers are not permitted to engage during the printing thereof and consequently the unit of upward movement of the bill count rack 37 does not add the unit upon the wheels of the bill counter section of the "A" register.

Depression of key 689 coincidentally causes the printing of an appropriate symbol "∧" opposite the "Previous" and "Present" line of the duplicate fill to designate its character. This symbol printing is shown on line 706 of tally 8 in Figure 33, and is effected by conventional symbol-printing mechanism fully disclosed in Patent No. 2,194,270.

During duplicate billing operations, the amounts involved are added and subtracted in the crossfooter and upon the completion of a third cycle the transaction is proved, the "Consumption" amount punched and the duplicate bill ejected as in normal billing operations.

18. Printing zeros

Ordinarily, on machines of this character, zeros are not permitted to print unless a digit of higher value than zero in a higher order type bar is printed to the left thereof.

The conventional mechanism for controlling the printing or non-printing of zeros will now be briefly described. The upper ends of rods 47 and 48 (Figure 38) associated with the left and right groups of type bars 13 normally lie a sufficient distance below conventional detent plates 707 and 708 so that when the machine is cycled with no amount indexed on amount keys 1 and 2, type bars 13 are permitted to rise to zero printing position. Hammers 53 (Figure 37) are not fired, however, because arms 709, tensioned upwardly by springs 712 against pins 713 in the type bars, are not permitted to rise a sufficient distance to bring shoulders such as 714 into alignment with hammer latches such as 715. Consequently, when a common actuator 716 in which the left ends of arms 709 are pivoted, is thrust toward the right as viewed in Figure 37, hammers 53 are not released. If, however, a type bar 13 rises above zero position, shoulder 714 rises into alignment with its corresponding hammer latch so that the hammer does fire. All hammers to the right of the order in which a hammer is permitted to fire are simultaneously fired by overlapping lugs such as 717 on the hammer latches. This mechanism is fully disclosed in Patent No. 2,194,270.

It is necessary, however, in performing certain billing operations on this machine, to have the units order type bars 13 of both the "Previous" and "Present" groups print zeros independently of the rising movement of higher order type bars. This is accomplished by having pins 720 (corresponding to pins 713) in the units order type bars of each group located one step above the pins 713 of the higher order bars (Figures 8 and 37). Hence, rising of the units order type bars to zero position brings shoulder 714 of its corresponding arm 709 into alignment with its corresponding hammer latch 715 to trip the latch and permit the units order hammer to fire and print the zero.

When no zero is indexed on amount keys 1 and 2, the units order bars are prevented from rising by depending projections 718 and 719 (Figure 38) formed on a bail 722. The opposite ends of bail 722 are pivoted at 723 on rod 246a. When the bail is in its normal position and rods 47 and 48 are in their normal leftward positions as shown in Figure 38, arm 52 of the units order bar of the right group of type bars lies immediately beneath projection 719 and an angularly disposed auxiliary arm 724 secured to arm 49 of the units order bar in the left group of type bars lies immediately beneath projection 718.

When a meter reading involves the printing of a zero in the units order position, indexing of a zero in either set of amount keys 1 or 2 removes its corresponding units order arm 724 or 52 one step to the right of projection 718 or 719 so that the bar is free to rise and print the zero. In this instance, the units bar is stopped in zero position by the zero stop 46 (Figure 2) which is set concurrently upon the indexing of a zero.

Referring to Figure 8, it is seen that the forward ends of arms 52 to the left of the units order arm are shorter than this arm so that projection 719 does not effect the upward movement of the higher order type bars when amounts involving these higher orders are indexed on the right set of amount keys 2. Similarly, the forward end of arm 724 is spaced a sufficient distance from the forward ends of arms 49 of the higher order bars so that projection 724 does not effect the upward movement of these bars when amounts involving higher orders are indexed on the left set of amount keys 1.

19. Manual operation control key

The machine is conditioned for manual control to permit taking of totals and correction of errors by manual operation control key 5 (Figure 1). Key 5 may be depressed only at the end of a third machine cycle.

Depression of this key:
(1) Disables automatic control by cams 18 (Figure 5),
(2) Disables type bar lock plate 298 (Figures 2 and 8),
(3) Permits restoration of "A" register selecting slide 182 (Figure 7),
(4) Enables the functioning of a conventional blank cycle enforcing mechanism indicated generally at 725 (Figure 38), and
(5) Enables control of the machine by keys 4 (Figure 1).

These multiple functions of key 5 will now be described in the above order.

Referring to Figure 42, the stem of key 5 has slots 726 that guide the key for vertical movement on studs 727 secured in the machine frame. The key is normally tensioned upwardly by a spring 728 and may be locked in its depressed position against the tension of the spring by an offset notch 729 in the upper end of the lower slot that may be engaged with the lower stud 727 when the key is depressed. A rearwardly extending lever 732 pivoted at 733 has a slot at its forward end embracing a pin 734 in key 5. The rear end of lever 732 is connected by a pin and slot connection 735 to the forward end of a lever 736 pivoted at 737 in the machine frame. The rear end of lever 736 has two laterally extending studs 738 and 739 secured on opposite sides of the lever.

Through the train of connections above described, depression of key 5 rocks the rear end of lever 736 downwardly a distance sufficient to cause stud 738 to strike the upper edge of pawl 95 and thrust the pawl downwardly against the tension of spring 98. Downward movement of pawl 95 disengages the pawl from the teeth of ratchet wheel 99 and thereby disables the automatic control of cams 18.

At the same time, stud 739 engages a vertically depending finger 742 formed on the right arm of bail 305 and rocks the bail clockwise removing lock plate 298 (Figure 8) from over the rear ends of the "Present" amount type bars. Stud 739 also concurrently strikes an upstanding arm 743 formed on bell crank 178 and rocks the bell crank counter-clockwise about rod 103. This permits slide 182 (Figure 7) to restore under the tension of its corresponding spring 197 and pulls link 187 downwardly to destroy the automatic selection of the "A" register for the ensuing machine cycle. A slide 744 suitably guided for vertical movement on and yieldingly connected to the horizontal arm of bell crank 178 by a strong spring 745 permits counterclockwise movement of the bell crank at this time, even though it is being normally urged clockwise by a cam surface 198 of cam 176.

Mechanism identical with that disclosed in Patent No. 2,194,270 is provided on this machine to enforce a blank cycle preparatory to taking a total. A blank cycle is one during which no amounts are indexed on amount keys 1 and 2. The mechanism insures the restoration of any tripped transfer dogs and conditions a selected totalizer for taking totals. Briefly, the mechanism comprises a lock slide 746 normally tensioned forwardly by a spring 747. In this position, upstanding projections 748 on the slide lie beneath lugs 749 on the crossfooter and register total keys 752 and 753 respectively, locking the keys against depression. A laterally extending pin 754 on slide 746 lies beneath a cam lug 755 formed on an arm 756 pivoted at 757 in the machine frame. A spring 758 normally tensions arm 756 downwardly but a flange 759 on an arm 762 lies within an opening 763 in arm 756 and suspends arm 756 from downward movement when flange 759 lies in the left end of the opening to the left of a lug 764 located centrally therein. Arm 762 is formed on a bail 765 pivoted on a rod 766 and is tensioned counterclockwise by a spring 767 so that flange 759 is held against lug 764. Suffice it now to say that movement of arms 756 and 762 is controlled by pins 768 in cam 379 and a plate 769 secured on rock shaft 23 and that the control is such that, during a blank cycle, flange 759 is permitted to enter the right end of opening 763. Since the right end of the opening is deeper than the left end, arm 756 descends under tension of spring 758 and lug 755 cams slide 746 to the right, withdrawing projections 748 from beneath lugs 749 so that total keys 752 and 753 may be depressed to condition the totalizers for taking totals.

In the present invention, additional control of the conventional blank cycle enforcing mechanism above described is provided by the manipulation of key 5. This additional control consists of a bail 772 pivoted on rod 766 adjacent bail 765. Bail 772 has a finger 773 lying behind arm 762 and another finger 774 lying beneath pin 734. A strong spring 775 connected to finger 774 pulls bails 772 and 765 clockwise about rod 766 so that when key 5 is in its normal or raised position, flange 759 is held in the left end of opening 763 and is not permitted to swing into the right end of the opening incident to the actuation of arms 762 and 756 by pins 768. Consequently during normal or billing operations, the total keys are held locked against depression.

Depression of key 5, however, rocks bail 772 counter-clockwise and releases bail 765 to function in its normal manner and enforce a blank cycle preparatory to taking a total as above described.

Two latches 777 and 778 (Figure 42) pivoted on a stud 779, operate coactively to latch key 5 against depression during billing cycles and to hold it latched until the end of a third machine cycle. Latch 777 has a lug 782 arranged to be swung into the path of movement of a laterally extending arm 783 formed on lever 736. A depending arm 784 on latch 777 is tensioned by a spring 785 against a pin 786 secured in pawl 95. During each forward stroke of pawl 95, lug 782 swings into the path of downward movement of arm 783, and during each rearward stroke of the pawl, is withdrawn from the path to the position shown in Figure 42. This locks key 5 against depression during the billing cycles.

Latch 778 has a lug 787 that is likewise movable into and out of the path of downward movement of arm 783, a spring 788 connected to a rearwardly extending arm of the latch normally tensions it toward effective position and during the first and second machine cycles, lug 787 remains in effective position to hold key 5 against depression at the end of these cycles. During the second half of a third machine cycle, one of four equi-spaced pins 789 secured in ratchet wheel 99 engage a beveled lug 792 formed on the rear end of latch 778 and rocks the latch counter-clockwise withdrawing lug 787 to ineffective position so that key 5 may be depressed at the end of a third machine cycle.

Following depression of key 5, lug 782 of latch 777 swings into and out of the path of upward movement of arm 783, incident to the reciprocal movement of pawl 95 to prevent release of the key prior to the completion of the instant total cycle.

20. Taking totals

Following depression of manual control key 5 and a blank cycle, totals or sub-totals may be taken from the totalizers by depressing the appropriate total key and depressing motor bar 6 to initiate a total cycle.

To take a total from the registers, the selected "A" or "B" register is engaged during the blank cycle and the appropriate key 753 depressed. This causes a slide such as 793 (Figures 7 and 38) to be moved to the left to change the timing of the operation of the register engaging mechanism so that the register remains engaged with actuating racks 37 only during the first half of the cycle. Referring to Figure 42, it is seen that an arm 795 secured on slide 793 connects the slide with a crossfooter non-add slide 796 for simultaneous movement therewith so that register totals are non-added in the crossfooter.

Except for this connection and certain control of detent plates 707 and 708 and bail 722 to be hereafter described, this mechanism is fully disclosed in Patent No. 2,194,270.

To take a total from the crossfooter the appropriate key 752 is depressed. This causes a corresponding slide such as 794 (Figures 6 and 38) to be moved to the left to change the timing of the operation of the crossfooter engaging mechanism so that the crossfooter remains engaged with its actuating racks only during the first half of the cycle.

This mechanism is full disclosed in the above mentioned patent.

The exception mentioned above in connection with control of detent plates 707 and 708 and bail 722 will now be described. Register total slide 793 has a depending lug 797 (Figures 38 and 41) lying immediately behind the right end of a lever 798 pivoted at 799 on the machine frame. The left end of lever 798 lies in front of a depending arm 802 secured on the right arm of a bail 803 pivoted on a rod 804. The forward end of plate 707 is pivoted at 805 to the left arm of bail 803 and the forward end of plate 708 is pivoted at 806 to an upstanding arm 807 secured on the bail. A spring 808 normally tensions bail 803 clockwise tensioning arm 802 against the left end of lever 793. In this position the forward ends of plates 707 and 708 lie over the upper ends of rods 47 and 48 as shown in Figures 38 and 39. A rearwardly extending arm 809 secured on the under side of bail 803 has a node 812 lying beneath a flange 813 formed on bail 722 and a spring 814 yieldingly connects arm 809 with the bail 722. Leftward thrust of slide 793 incident to depression of a register total key, causes lug 797 to swing lever 793 clockwise to rock bail 803 counter-clockwise, and rock bail 722 clockwise. The amount of movement imparted to the bails is sufficient to withdraw projections 718 and 719 from over arms 724 and 52 and to withdraw the forward ends of plates 707 and 708 to the position shown in dotted lines in Figure 40, i. e., completely from over the upper ends of rods 47 and 48. This permits both the "Previous" and "Present" groups of type bars to rise to print the register totals.

Crossfooter total slide 794 also has a depending lug 815 similarly lying behind the right end of lever 793, a clearance, however, being provided between the forward edge of the lug and the rear edge of the lever (Figure 41). Due to this clearance, depression of crossfooter total keys imparts only a partial movement to bails 803 and 722. This partial movement is sufficient to withdraw projections 718 and 719 from over arms 724 and 52 but is insufficient to withdraw plates 707 and 708 completely from over pins 47 and 48. This intermediate position of the plates is shown in full lines in Figure 40, wherein plate 708 still remains effective to prevent rising movement of the right group of type bars 13. Plate 707 is recessed at its right end as at 816 for a width corresponding to the four right-hand rods 47 associated with the left group of type bars which, bear in mind, are the only bars of the left group having racks engaging crossfooter wheels 17. Hence, when plate 707 occupies its intermediate position, these type bars are free to rise and print the crossfooter total, whereas the remaining bars to the left, having no corresponding crossfooter wheels, are restrained from rising and printing nines by the non-recessed portion of plate 707.

If the crossfooter has been cleared prior to the taking of a total, a double zero printing with an appropriate total symbol is printed as indicated on the last line 817 of tally 8 in Figure 34, to notify the operator that the crossfooter is clear. These zeros are permitted to print by the zero printing mechanism previously described. In this printing of the zeros, the units order rack of the left group of type bars 13 is stopped in zero printing position by the transfer lug on the units order wheel of the crossfooter engaging its corresponding conventional transfer dog, and, the units order type bar of the right group is stopped in zero position by the units order rod 48 striking the under side of detent 708.

21. Correcting errors

As before stated, if an inserted bill is not punched and ejected at the end of a third machine cycle, the operator is thereby signaled of error. In this event the error is corrected by conditioning the machine for manual control by depressing key 5, initiating a blank cycle and taking a crossfooter total as above described, thus clearing the machine of the error. Following this, key 5 is released, the correct amounts entered upon amount keys 1 and the billing proceeded with as in normal billing operations.

While the form of mechanism herein shown and described, is admirably adapted to fulfill the objects primarily stated, it is to be understood that it is not intended to confine the invention to the one form of embodiment herein disclosed, for it is susceptible of embodiment in various forms all coming within the scope of the claims which follow.

What is claimed is:

1. In a machine of the class described, two separate groups of type bars, indexing mechanism for each group of type bars, a totalizer, adding actuators arranged to enter numbers in the totalizer by actuating the totalizer in one direction only, subtracting actuators arranged to enter numbers in the totalizer by actuation of the totalizer in a reverse direction only, means for connecting said adding actuators only with the type bars of one group for movement therewith and means for connecting said subtracting actuators only with the type bars of the other group for movement therewith.

2. In a machine of the class described, separate groups of type bars occupying separate columns, separate sets of amount indexing keys for controlling respectively the type bars of said groups, a totalizer, adding and subtracting actuators therefor, all of said adding actuators being associated exclusively with the bars of one group and all of said subtracting actuators being associated exclusively with the bars of the other group and means for shifting the totalizer respectively out of engagement with the adding actuators and into engagement with the subtracting actuators and out of engagement with the subtracting actuators and into engagement with the adding actuators.

3. In a machine of the class described separate groups of type bars, control mechanisms for controlling the printing positions of said type bars, separate sets of amount keys associated with the corresponding groups of type bars for setting the corresponding control mechanisms to cause the type bars of said sets to print respectively the amounts indexed by the corresponding keys, a totalizer, actuators associated with the type bars of one of said groups, means for connecting the actuators with the totalizer in timed relation to the movements of the type bars to add on the totalizer amounts indexed on one of the sets of amount keys, actuators associated with the type bars of the other group, and means for connecting the latter actuators with the totalizer in timed relation to the movements of the bars of the latter group to subtract on the totalizer amounts indexed on the other set of amount keys.

4. In a machine of the class described, two groups of amount type bars, amount indexing keys for the bars of each of said groups, a totalizer comprising a series of coaxial wheels, actuators on one side of the axis of the totalizer wheels and associated only with the bars of one of said groups for adding on the totalizer wheels amounts indexed on the indexing keys for that group and actuators on the other side of the axis of the totalizer wheels and associated only with the bars of the other group for subtracting on the same totalizer wheels amounts indexed on the indexing keys for the latter group.

5. In a machine of the class described, two sets of amount indexing keys, two separate groups of type bars controlled respectively by the keys of said sets, a totalizer and means for connecting the type bars of each of said groups and the totalizer to enter in the totalizer, during a cycle, the number indexed by either of said sets of keys.

6. In a machine of the class described, a totalizer, two separate sets of type bars arranged to print in different columns, means for connecting the type bars of one of said sets and the totalizer for operating the totalizer in one direction by the latter type bars to add numbers corresponding with the numbers printed by the type bars of said set and means for connecting the type bars of the other of said sets and the totalizer to operate the totalizer in a reverse direction by the type bars of the latter set to subtract numbers in the totalizer corresponding with the numbers printed by the type bars of the latter set.

7. In a machine of the class described, two groups of type bars each comprising bars of several denominations, a totalizer comprising wheels of several denominations, racks connected with the respective type bars of one group and arranged to engage the wheels of corresponding denominations of the totalizer to actuate the totalizer in an additive direction during the movement of said type bars in a given direction and racks connected with the respective type bars of the other group and arranged to engage the totalizer wheels of the same denominations to actuate the totalizer in reverse direction during the movement of the bars of the latter group in the same direction as said movement of the bars of said first group.

8. In a machine of the class described, two groups of amount type bars, amount indexing keys for the bars of each of said groups, a totalizer comprising a series of coaxial wheels, actuators located on one side of the axis of the totalizer wheels and associated only with the bars of one of said groups for actuating said wheels to add amounts indexed on the indexing keys for that group and actuators located on the other side of the axis of the totalizer wheels and associated only with the bars of the other group for actuating the same wheels to substract directly amounts indexed on the indexing keys for the latter group.

9. In a machine of the class described, two groups of amount type bars, amount indexing keys for the bars of each of said groups, a totalizer, actuators associated only with the bars of one of said groups and arranged to move in a certain direction to actuate the totalizer to add therein amounts indexed on the indexing keys for that group and actuators associated only with the bars of the other of said groups and arranged to actuate the totalizer to subtract directly therein amounts indexed on the indexing keys for that group, by movement in the same direction as said movement of said first bars.

10. In a machine of the class described, a set of amount indexing keys, a set of differential members controlled by said keys, a second set of amount indexing keys, a second set of differential members controlled by the latter keys, machine operated means for actuating said differential members, a totalizer comprising a series of wheels, means for connecting the differential members of the first set with the wheels of the totalizer to rotate said wheels in one direction to add the numbers indexed by said first set of keys and means for connecting the differential members of the other set to said wheels of the totalizer to rotate said wheels in the opposite direction to subtract directly the numbers indexed by the second set of keys.

11. In a machine of the class described, a totalizer comprising a series of coaxial wheels, a set of amount indexing keys, a set of differential members controlled by said keys and arranged on one side of the axis of the totalizer wheels, a second set of amount indexing keys, a second set of differential members controlled by the latter keys and arranged on the opposite side of the axis of the totalizer wheels, machine operated means for actuating said differential members, means for connecting the differential members of the first set with the wheels of the totalizer to rotate said wheels in one direction to add the numbers indexed by the first set of keys and means for connecting the differential members of the second set with the wheels of the totalizer to rotate said wheels in the opposite direction to subtract the numbers indexed by the second set of keys.

12. In a machine of the class described, a register, a set of amount indexing keys, a set of differential members controlled by said keys and arranged to move in a certain direction to add in the register the amounts indexed by said keys, means for connecting the differential members with the register, a second set of amount indexing keys, a second set of differential members controlled by said keys and arranged to move in the same direction to subtract directly in the register the amounts indexed by the second set of keys and means for connecting the second set of differential members with the register.

13. In a machine of the class described, a set of amount indexing keys, a set of differential members controlled by said keys and arranged to move in a certain direction to add, in the register, numbers indexed by said keys, means for connecting said differential members with the register, a set of type bars connected with said differential members and arranged to be moved to printing position by the differential movements of said members, a second set of amount indexing keys, a second set of differential members controlled by said keys and arranged to move in the same direction to subtract directly in the register the amounts indexed by the latter set of keys, means for connecting the latter differential members with the register, a second set of type bars connected with said second set of differential members and arranged to be moved to printing position by the differential movements of said members and machine operated means for moving said type bars and differential members.

OSCAR J. SUNDSTRAND.

REFERENCES CITED

The following references are of record in the file of this patent:

UNITED STATES PATENTS

| Number | Name | Date |
|---|---|---|
| 976,129 | Kleinhans | Nov. 15, 1910 |
| 1,005,555 | Kettering | Oct. 10, 1911 |
| 1,531,041 | Stinson | Mar. 24, 1925 |
| 1,707,303 | Greve | Apr. 2, 1929 |

(Other references on following page)

UNITED STATES PATENTS

| Number | Name | Date |
|---|---|---|
| 1,976,600 | Carroll | Oct. 9, 1934 |
| 2,095,368 | Muller | Oct. 12, 1937 |
| 2,107,374 | Ewald | Feb. 8, 1938 |
| 2,149,371 | Uhlig | Mar. 7, 1939 |
| 2,178,339 | Gates | Oct. 31, 1939 |
| 2,250,837 | Mueller | July 29, 1941 |
| 2,308,144 | Anderson | Jan. 12, 1943 |
| 2,347,607 | Muller | Apr. 25, 1944 |
| 2,382,661 | Pott | Aug. 14, 1945 |

FOREIGN PATENTS

| Number | Country | Date |
|---|---|---|
| 376,439 | Germany | May 28, 1923 |
| 497,196 | Great Britain | Dec. 14, 1938 |

OTHER REFERENCES

Pott, Application Ser. No. 310,079, published by A. P. C., May 25, 1943. Continuation of abandoned application 704,354.